(12) United States Patent
Ishii

(10) Patent No.: US 9,942,493 B2
(45) Date of Patent: Apr. 10, 2018

(54) IMAGE PICKUP APPARATUS AND READING METHOD FOR OUTPUTTING SIGNALS BASED ON LIGHT FLUX PASSING THROUGH AN ENTIRE AREA OF AN EXIT PUPIL AND LIGHT FLUX PASSING THROUGH PART OF THE EXIT PUPIL

(71) Applicant: CANON KABUSHIKI KAISHA, Tokyo (JP)

(72) Inventor: Hirokazu Ishii, Chofu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/388,167

(22) Filed: Dec. 22, 2016

(65) Prior Publication Data

US 2017/0214867 A1    Jul. 27, 2017

(30) Foreign Application Priority Data

Jan. 21, 2016 (JP) .................................. 2016-009789

(51) Int. Cl.
| | |
|---|---|
| H04N 5/353 | (2011.01) |
| H04N 5/232 | (2006.01) |
| H04N 5/345 | (2011.01) |
| H04N 5/369 | (2011.01) |
| H04N 5/374 | (2011.01) |
| H04N 5/378 | (2011.01) |

(52) U.S. Cl.
CPC ....... *H04N 5/3537* (2013.01); *H04N 5/23245* (2013.01); *H04N 5/3456* (2013.01); *H04N 5/3532* (2013.01); *H04N 5/3696* (2013.01); *H04N 5/374* (2013.01); *H04N 5/378* (2013.01)

(58) Field of Classification Search
CPC ............. H04N 5/3537; H04N 5/23245; H04N 5/3456; H04N 5/3532; H04N 5/3696; H04N 5/374; H04N 5/378
See application file for complete search history.

(56) References Cited

U.S. PATENT DOCUMENTS

| | | | |
|---|---|---|---|
| 6,829,008 B1 | 12/2004 | Kondo | |
| 9,270,911 B2 | 2/2016 | Taniguchi | |
| 2014/0145068 A1* | 5/2014 | Meynants | ......... H01L 27/14605 250/208.1 |

(Continued)

FOREIGN PATENT DOCUMENTS

| | | |
|---|---|---|
| JP | 2000-156823 | 6/2000 |
| JP | 2010-219958 | 9/2010 |

*Primary Examiner* — Nicholas Giles
(74) *Attorney, Agent, or Firm* — Fitzpatrick, Cella, Harper & Scinto

(57) ABSTRACT

An image pickup apparatus including a pixel array including a first pixel that outputs a signal based on a light flux passed through an entire area of an exit pupil, a second pixel that outputs a signal based on a light flux passed through a part of the exit pupil, and a floating diffusion area shared by the plurality of rows adjacent to one another; and a controller that sets a first and a second accumulation periods so as to prevent them from overlapping with each other for a predetermined length of time or longer, when the first pixel read in the first scanning shares the floating diffusion area with the second pixel read in the second scanning, the first and second accumulation periods being periods for the row in which the first and the second pixel are arranged, respectively.

7 Claims, 26 Drawing Sheets

(56) References Cited

U.S. PATENT DOCUMENTS

2017/0077165 A1\* 3/2017 Kimura ............. H01L 27/14643
2017/0237920 A1\* 8/2017 Ishiwata ............ H04N 5/37452
　　　　　　　　　　　　　　　　　　　　　　　　348/300
2017/0338258 A1\* 11/2017 Kim .................. H01L 27/14645

\* cited by examiner

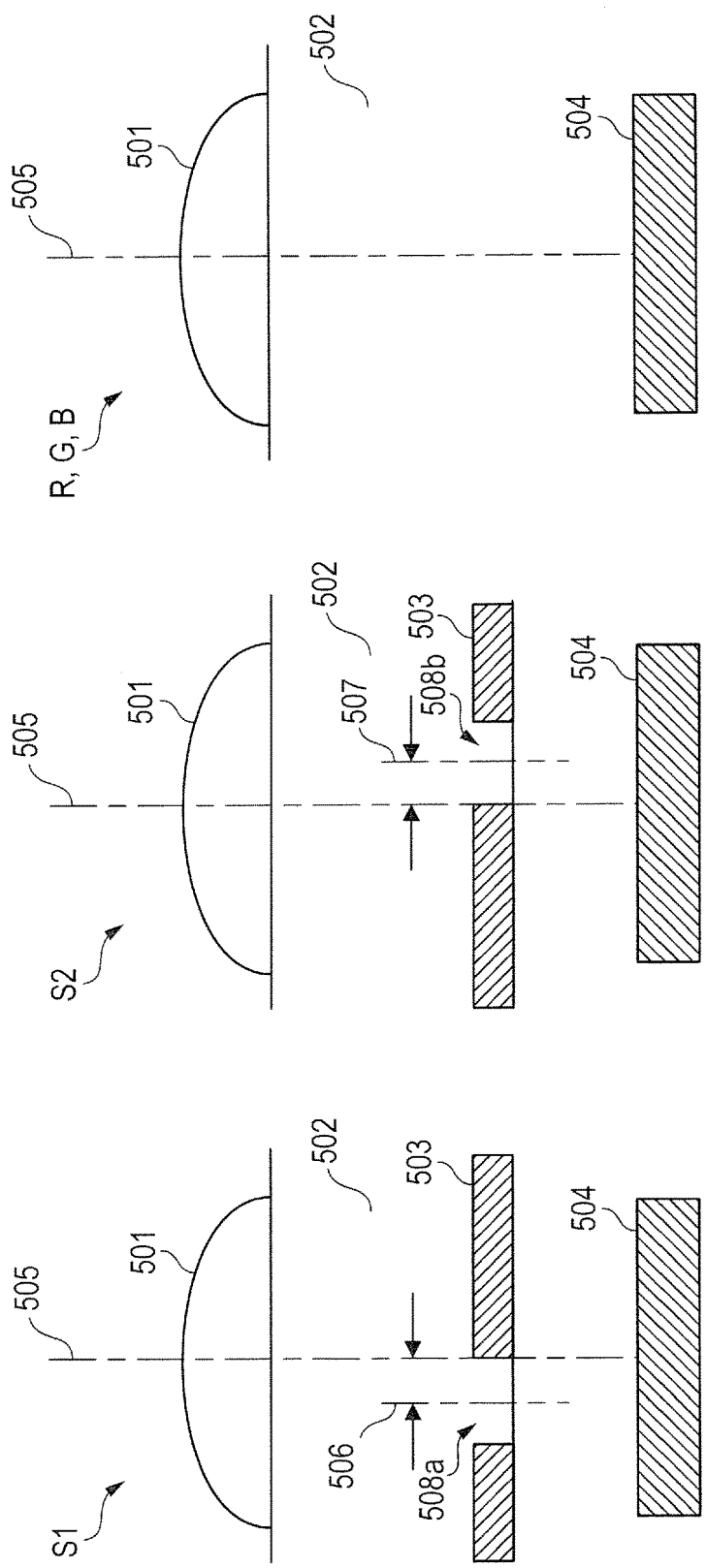

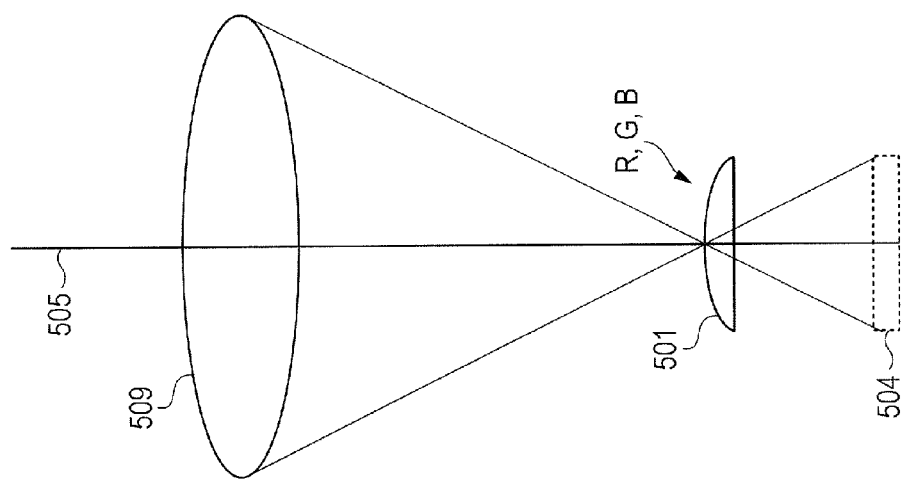
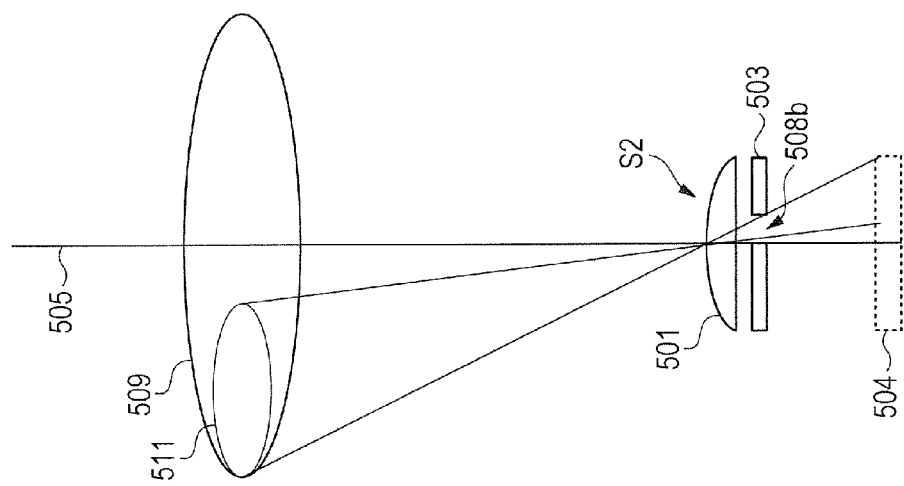
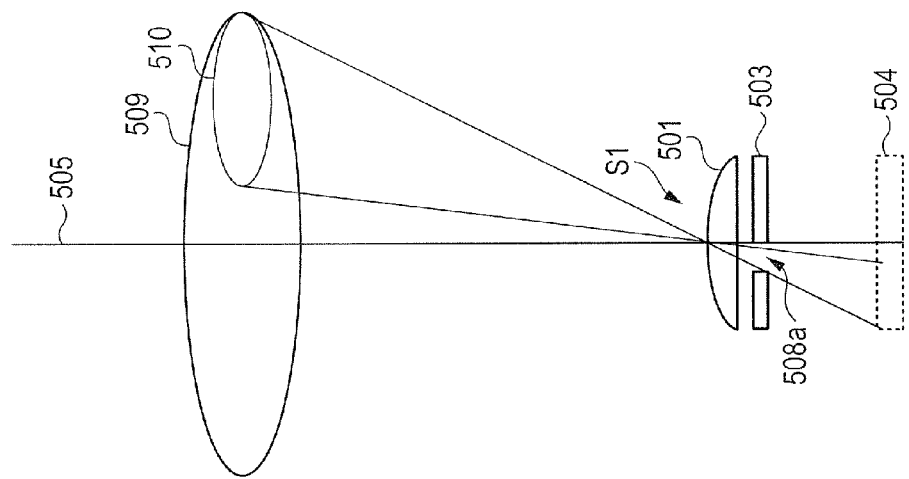

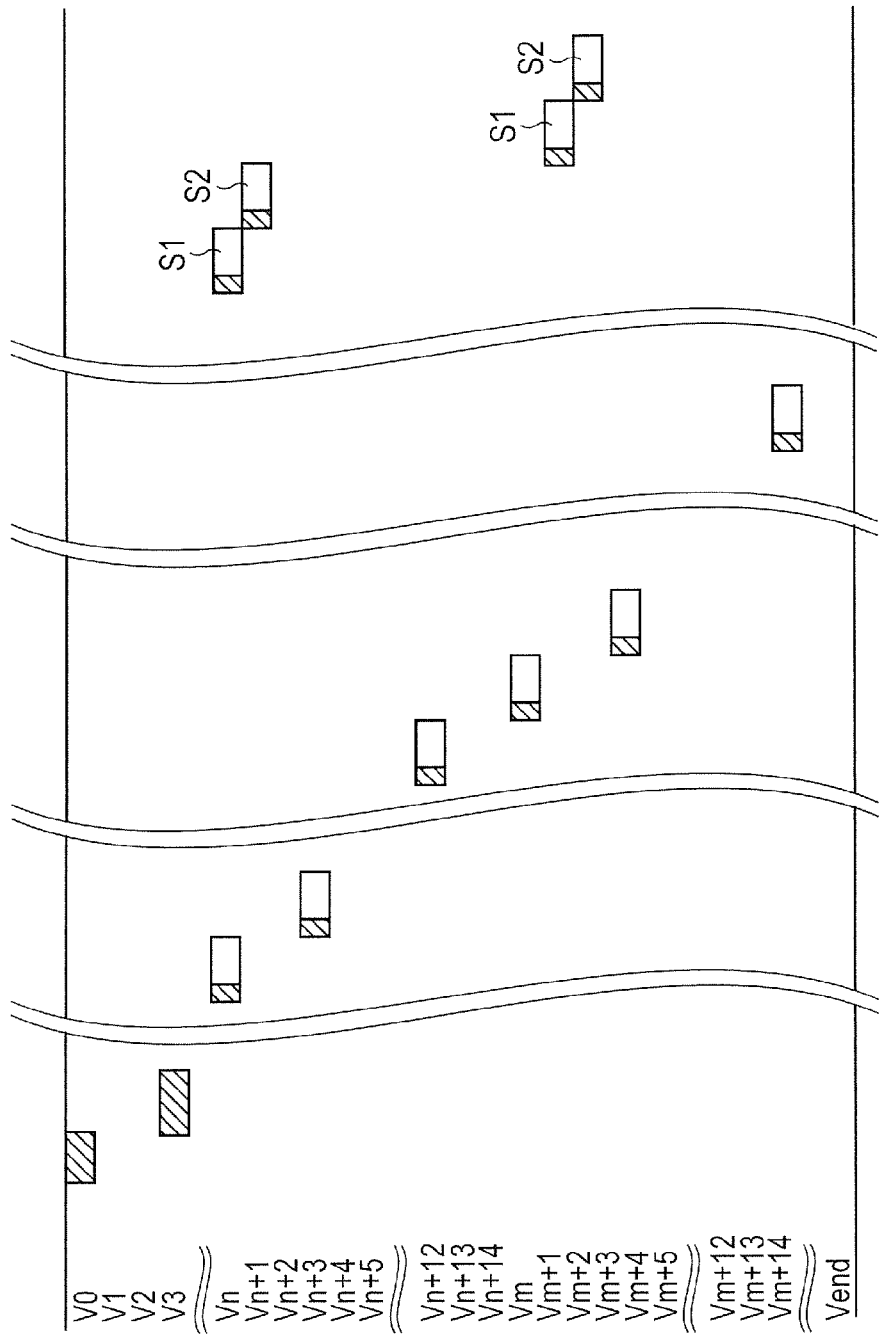

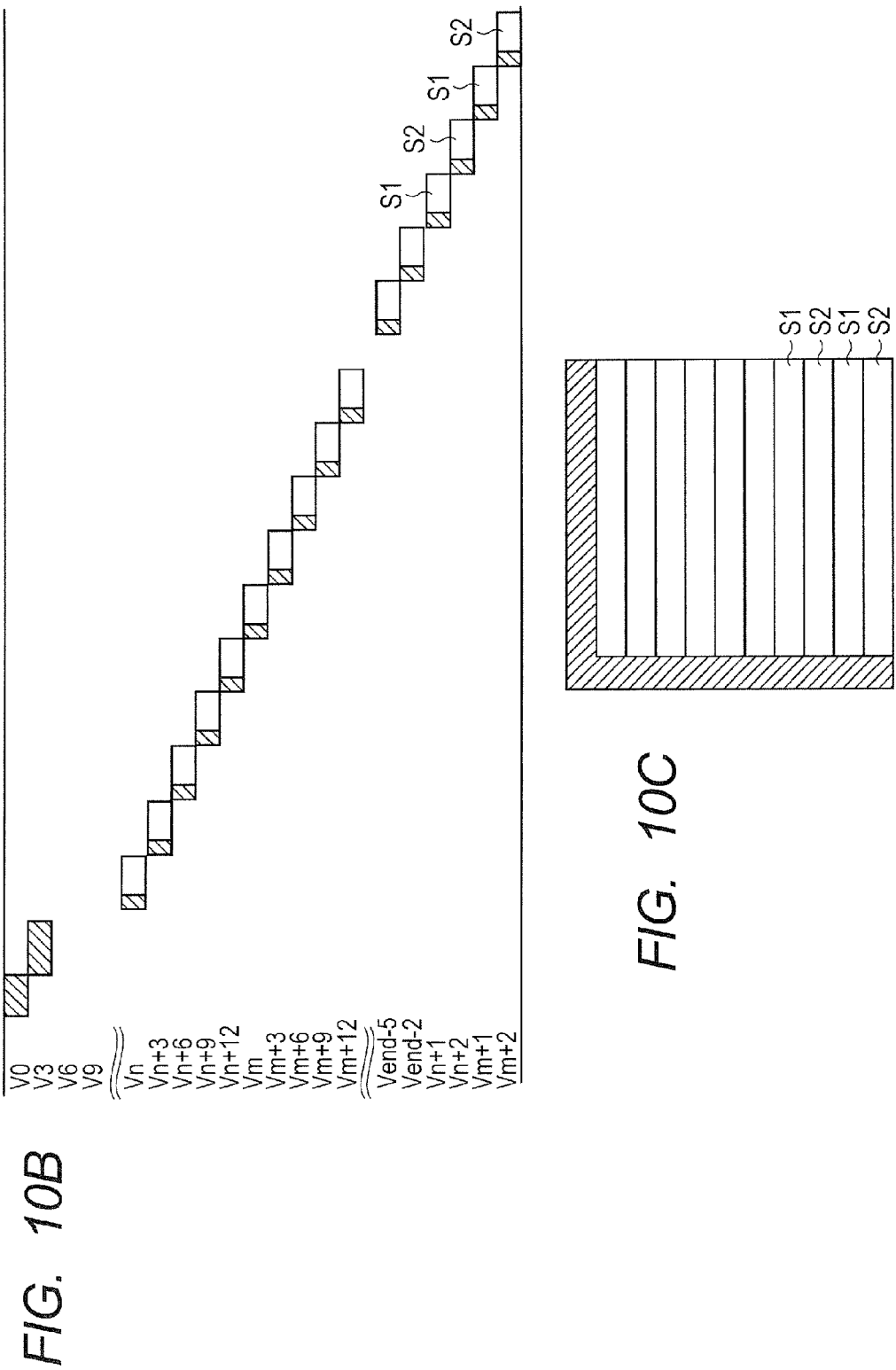

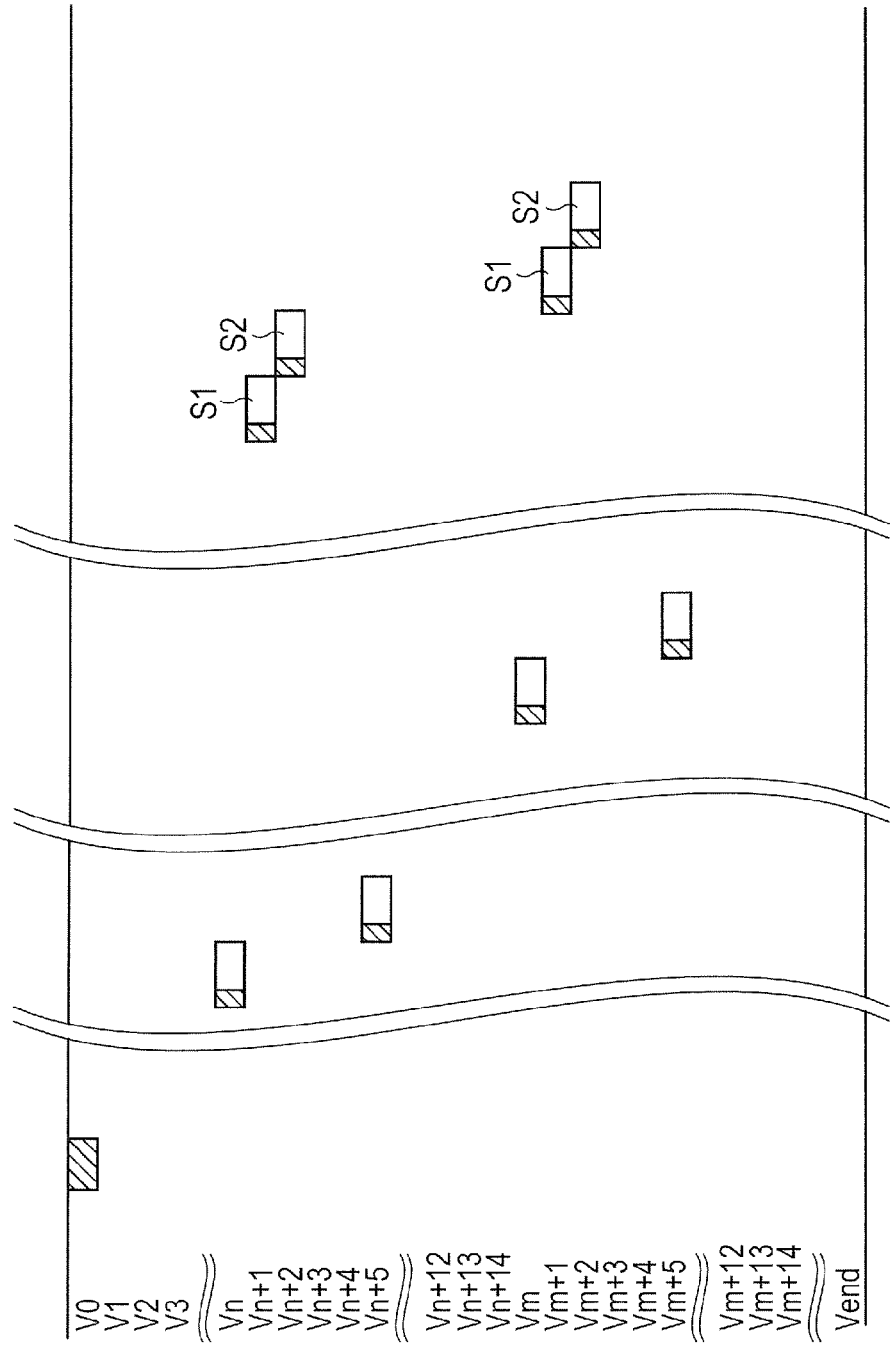

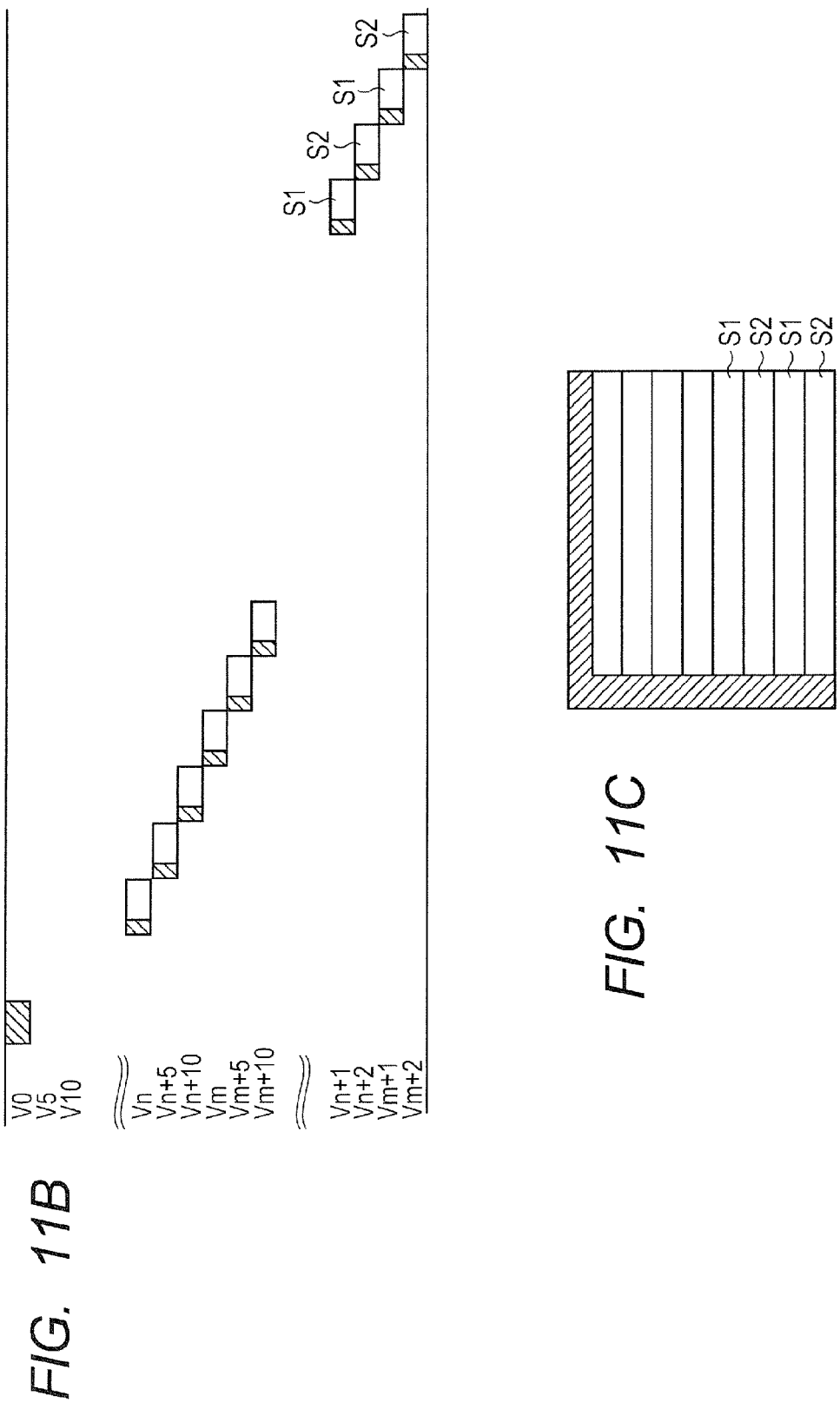

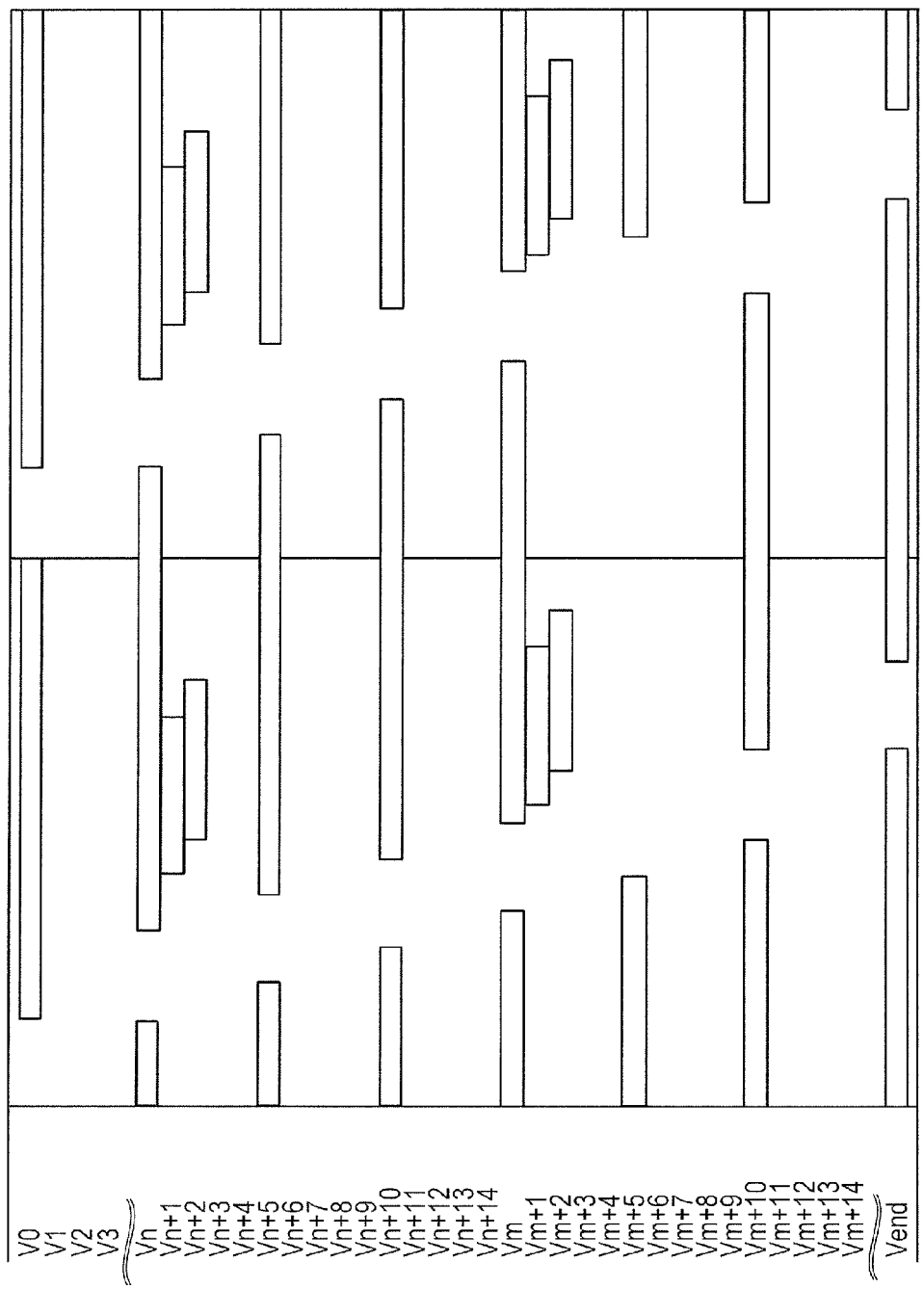

IMAGE PICKUP APPARATUS AND READING METHOD FOR OUTPUTTING SIGNALS BASED ON LIGHT FLUX PASSING THROUGH AN ENTIRE AREA OF AN EXIT PUPIL AND LIGHT FLUX PASSING THROUGH PART OF THE EXIT PUPIL

BACKGROUND OF THE INVENTION

Field of the Invention

This disclosure relates to an image pickup apparatus and a reading method.

Description of the Related Art

Image pickup apparatus using contrast detection autofocus have been known. In contrast detection autofocus, an image pickup element is used as a focus detection sensor. Focus adjustment in contrast detection autofocus is performed by moving the position of a focus lens so that the contrast of a signal obtained by the image pickup element is maximum. However, contrast detection autofocus requires assessing contrast information while moving a photographing lens. This means that, in contrast detection autofocus, the focus lens needs to be moved again after the contrast is found to be maximum, to a position where the maximum contrast is accomplished. Contrast detection autofocus therefore takes long to finish focus detection, and renders quick autofocus operation difficult.

As a solution to this drawback, in recent years, image pickup apparatus using phase difference detection autofocus have been proposed. The image pickup apparatus configured to perform phase difference detection autofocus use an image pickup element that has a built-in phase difference detection function. Image pickup apparatus of this type may calculate an out-of-focus amount directly based on a signal obtained from the image pickup element, and are accordingly capable of quick autofocusing.

An example of this type is a solid-state image pickup apparatus described in Japanese Patent Application Laid-Open No. 2000-156823. The solid-state image pickup apparatus includes a pixel S1 in which a light-shielding layer having an opening on one side of a central portion of a photoelectric conversion area is formed and a pixel S2 in which a light-shielding layer having an opening on the other side of the central portion of the photoelectric conversion area is formed. In Japanese Patent Application Laid-Open No. 2000-156823, phase difference detection autofocus may be accomplished based on signals from the pixels S1 and S2.

In Japanese Patent Application Laid-Open No. 2010-219958, there is described a technology in which pixels for focus detection are arranged in rows that are dropped in thinning reading. To photograph a moving image, image data is obtained by thinning reading and then signals from the pixels for focus detection are read. In Japanese Patent Application Laid-Open No. 2010-219958, there is described setting of accumulation times separately for rows that are read in order to obtain image data and for rows in which the pixels for focus detection are arranged.

With image pickup apparatus of the related art, however, fine image quality and focus detection precision cannot always be obtained.

SUMMARY OF THE INVENTION

According to an aspect of the invention, there is provided an image pickup apparatus, including: a pixel array portion in which a plurality of pixels each including a photoelectric converter are arranged into a matrix pattern, a first pixel among the plurality of pixels is configured to output a signal that is generated based on a light flux that passes through an entire area of an exit pupil of an image pickup optical system, a second pixel among the plurality of pixels is configured to output a signal that is generated based on a light flux that passes through a pupil area, which is a part of the exit pupil, and a floating diffusion area connected to the photoelectric converter via a transfer switch is shared by the plurality of pixels located in a plurality of rows adjacent to one another; a row selecting unit configured to select, in first scanning, a row in which the first pixel is arranged while thinning some pixels, and to select, in second scanning, a row in which the second pixel is arranged and which differs from the row selected in the first scanning; a reading unit configured to read a signal that is generated based on a voltage of the floating diffusion area of the pixel that is located in the row selected by the row selecting unit; and a controller configured to set a first accumulation period for the row in which the first pixel is arranged and a second accumulation period for the row in which the second pixel is arranged separately so as to prevent the first accumulation period and the second accumulation period from overlapping with each other for a predetermined length of time or longer, when the first pixel located in one row that is read in the first scanning shares the floating diffusion area with the second pixel that is located in another row and the another row is read in the second scanning.

According to another aspect of the invention, there is provided an image pickup apparatus, including: a pixel array portion in which a plurality of pixels each including a photoelectric converter are arranged into a matrix pattern, a first pixel among the plurality of pixels is configured to output a signal that is generated based on a light flux that passes through an entire area of an exit pupil of an image pickup optical system, a second pixel among the plurality of pixels is configured to output a signal that is generated based on a light flux that passes through a pupil area, which is a part of the exit pupil, and a floating diffusion area connected to the photoelectric converter via a transfer switch is shared by the plurality of pixels located in a plurality of rows adjacent to one another; a row selecting unit configured to select, in first scanning, a row in which the first pixel is arranged while thinning some pixels, and to select, in second scanning, a row in which the second pixel is arranged and which differs from the row selected in the first scanning; a reading unit configured to read a signal that is generated based on a voltage of the floating diffusion area of the pixel that is located in the row selected by the row selecting unit; and a controller configured to set a first accumulation period for the row in which the first pixel is arranged and a second accumulation period for the row in which the second pixel is arranged separately so that the first accumulation period is not shorter than the second accumulation period, when the first pixel located in one row that is read in the first scanning shares the floating diffusion area with the second pixel that is located in another row and the another row is read in the second scanning.

Further features of the present invention will become apparent from the following description of exemplary embodiments with reference to the attached drawings.

BRIEF DESCRIPTION OF THE DRAWINGS

FIG. 4A and FIG. 4B are diagrams for illustrating an example of the layout of pixels in an image pickup element.

FIG. 5A, FIG. 5B and FIG. 5C are sectional views for illustrating pixels arranged in the image pickup element.

FIG. 6A, FIG. 6B and FIG. 6C are each a diagram for schematically illustrating the relationship between a light flux that passes through an exit pupil of an image pickup optical system and a pixel.

FIG. 10A, FIG. 10B and FIG. 10C are diagrams for illustrating an example of reading operation that is executed when a moving image is obtained in a high definition mode.

FIG. 11A, FIG. 11B and FIG. 11C are diagrams for illustrating an example of reading operation that is executed when a moving image is obtained in a fast mode.

FIG. 13A, FIG. 13B and FIG. 13C are diagrams for illustrating an example of reading operation that is executed when a moving image is obtained.

DESCRIPTION OF THE EMBODIMENTS

Exemplary embodiments of the present invention are hereinafter described in detail with reference to the attached drawings.

Embodiment

Figure 1:
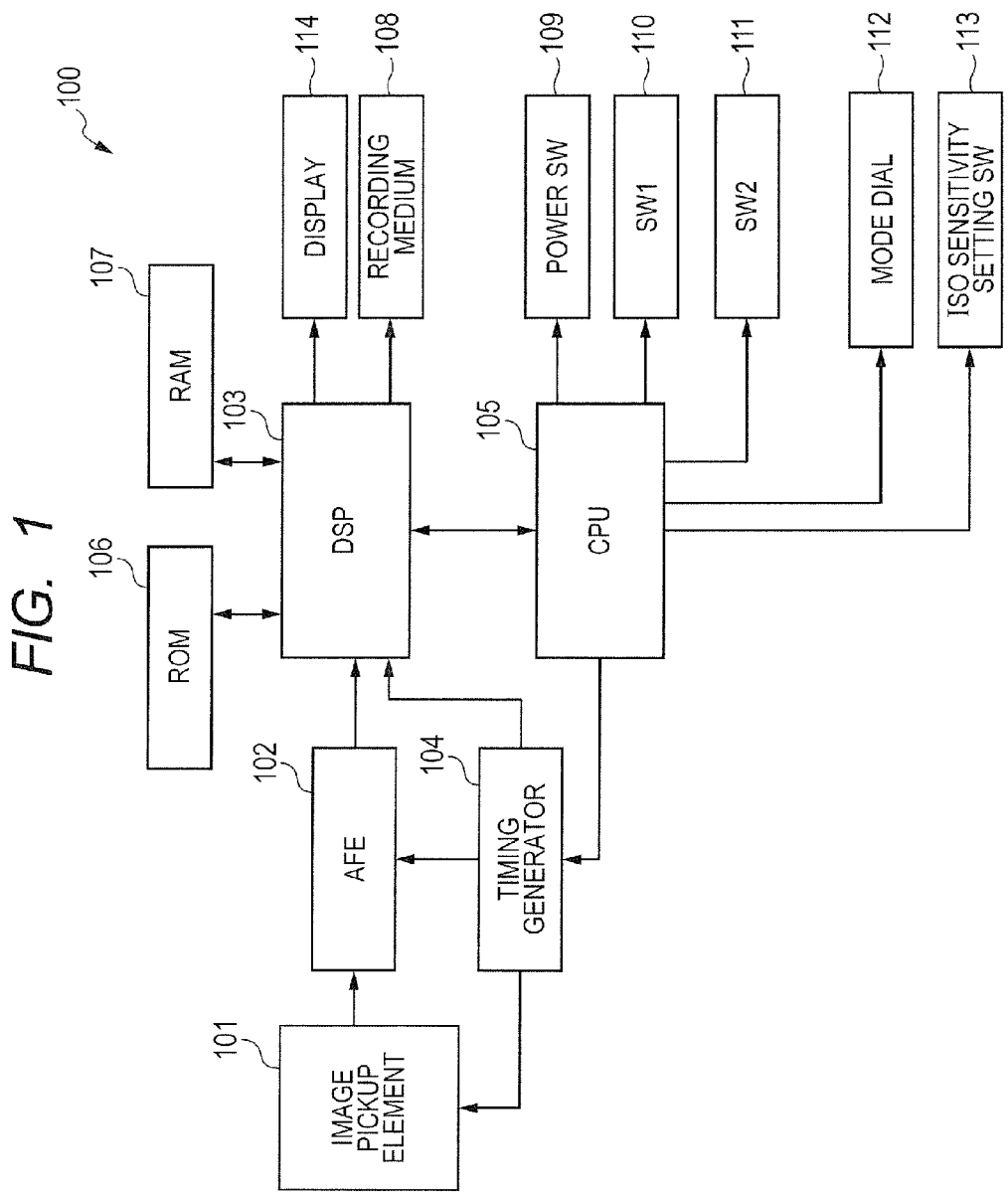
FIG. 1 is a block diagram for illustrating an image pickup apparatus according to an embodiment of the present invention.

An image pickup apparatus according to an embodiment of the present invention is described with reference to the drawings. FIG. 1 is a block diagram for illustrating the image pickup apparatus according to this embodiment. An image pickup apparatus 100 according to this embodiment is, for example, a digital single-lens reflex camera. The image pickup apparatus 100 according to this embodiment includes an image pickup element 101 and an analog front end (AFE) 102. The image pickup apparatus 100 according to this embodiment further includes a digital signal processor (DSP) 103 and a timing generator (TG) 104. The image pickup apparatus 100 according to this embodiment further includes a central processing unit (CPU) 105. The image pickup apparatus 100 according to this embodiment further includes a read only memory (ROM) 106, a random access memory (RAM) 107, a display 114, and a connector (not shown) to which a recording medium 108 is attached. Also included in the image pickup apparatus 100 of this embodiment are a power switch 109, a first-stage shutter switch 110, a second-stage shutter switch 111, a mode dial 112, and an ISO sensitivity setting switch 113.

A CMOS-type image pickup element, namely, a CMOS image sensor, is used as the image pickup element 101. The image pickup element 101 therefore uses a line exposure sequential reading method, namely, rolling shutter. The image pickup element 101 includes a built-in amplifier circuit (not shown) configured to switch the gain depending on the ISO sensitivity. The AFE 102 includes a built-in AD converter configured to convert an analog signal that is received from the image pickup element 101 into a digital signal. The AFE 102 has a function of clamping the dark level offset.

The DSP (a signal processing unit) 103 is configured to perform correction processing, development processing, compression processing, and various other types of image processing on a digital signal from the AFE 102, namely, image data. The DSP 103 is also configured to execute processing of accessing the ROM 106, RAM 107, and other memories. The DSP 103 is also configured to execute processing of writing image data to the recording medium 108. The DSP 103 is also configured to execute processing of displaying various types of data with the use of the display 114. The DSP 103 is also configured to perform various types of correction processing on image data recorded on the RAM 107. The DSP 103 is also configured to perform correction processing on various noises generated in the image pickup element 101. The DSP 103 is also configured to detect a defective pixel and to execute processing of correcting the defective pixel. The DSP 103 is also configured to perform correction processing on pixels for phase difference detection S1 and S2, which are described later. The DSP 103 is further configured to perform correction processing on pixels that are located around the pixels for phase difference detection S1 and S2. The DSP 103 is also configured to calculate defocus information with the use of output from the pixels for phase difference detection S1 and S2. Details of the DSP 103 are described later.

The timing generator (a timing generating circuit) 104 is configured to supply a clock signal, a control signal, and the like to the image pickup element 101, the AFE 102, and the DSP 103 under control of the CPU 105. The timing generator 104 is also configured to generate timing signals that correspond to various reading modes of the image pickup element 101, in cooperation with the CPU 105. In this way, the timing generator 104 and the CPU 105 cooperate with each other to function as a controller configured to control the image pickup element 101 and others.

The CPU (a controller) 105 is configured to control the DSP 103 and the timing generator 104. The CPU 105 is also configured to execute photometric processing, which is described later. The CPU 105 is also configured to execute autofocus (AF) processing that uses output from a focus detection element 209 (see FIG. 2A and FIG. 2B). The focus detection element 209 is provided independently of the image pickup element 101, and is configured to execute phase difference focus detection. The CPU 105 is also configured to execute AF processing and the like based on defocus information, which is obtained from signals of the pixels for phase difference detection S1 and S2 incorporated in the image pickup element 101.

Connected to the CPU 105 are, for example, the power switch 109, the first-stage shutter switch (SW1) 110, the second-stage shutter switch (SW2) 111, the mode dial 112, and the ISO sensitivity setting switch 113. The CPU 105 is configured to execute processing suited to the settings of the switches and dial connected to the CPU 105.

The ROM 106 is configured to store, among others, control programs for controlling the image pickup apparatus 100, namely, programs executed by the CPU 105, and various types of data for correction. The ROM 106 is generally built from a flash memory or other non-volatile memories. Access to the RAM 107 may be faster than access to the ROM 106. The RAM 107 is used as a work area, where image data processed by the DSP 103 and other types of information are stored temporarily.

The recording medium 108 is configured to store, for example, image data of a photographed image. A memory card, for example, is used as the recording medium 108. The recording medium 108 is connected to the DSP 103 by, for example, the connector (not shown). The power switch 109 is operated by a user to activate the image pickup apparatus 100. When the first-stage shutter switch SW1 is switched on, pre-photographing processing such as photometric processing and focus detection processing is executed. When the second-stage shutter switch SW2 is switched on, a main mirror 207 (see FIG. 2A and FIG. 2B), a sub-mirror 208 (see FIG. 2A and FIG. 2B), and a focal plane shutter 210 (see FIG. 2A and FIG. 2B) are driven. A series of image pickup operation steps in which image data obtained by the image pickup element 101 is written to the recording medium 108 via the AFE 102 and the DSP 103 is then started.

The mode dial 112 is used to set various operation modes of the image pickup apparatus 100. The ISO sensitivity setting switch 113 is used to set the ISO sensitivity. The display 114 is configured to display information about the image pickup apparatus 100, and also to display a still image or moving image that is photographed, and the like. A liquid crystal display (LCD), for example, is used as the display 114.

Figure 2A:
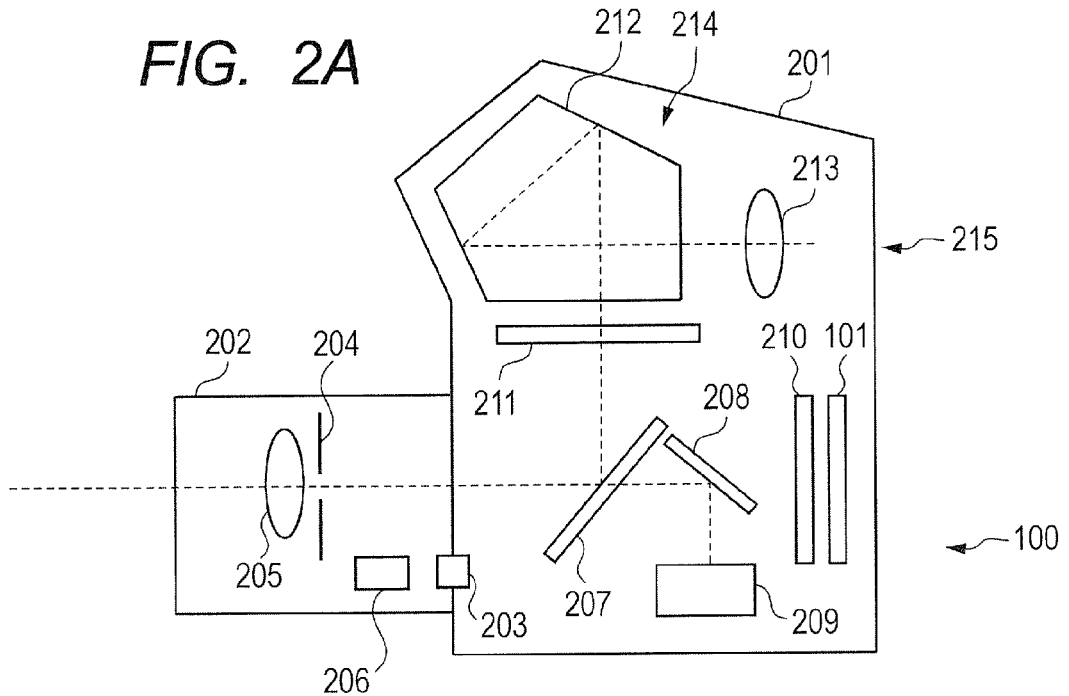
FIG. 2A and FIG. 2B are diagrams for illustrating the configuration of the image pickup apparatus according to the embodiment of the present invention.
Figure 2B:
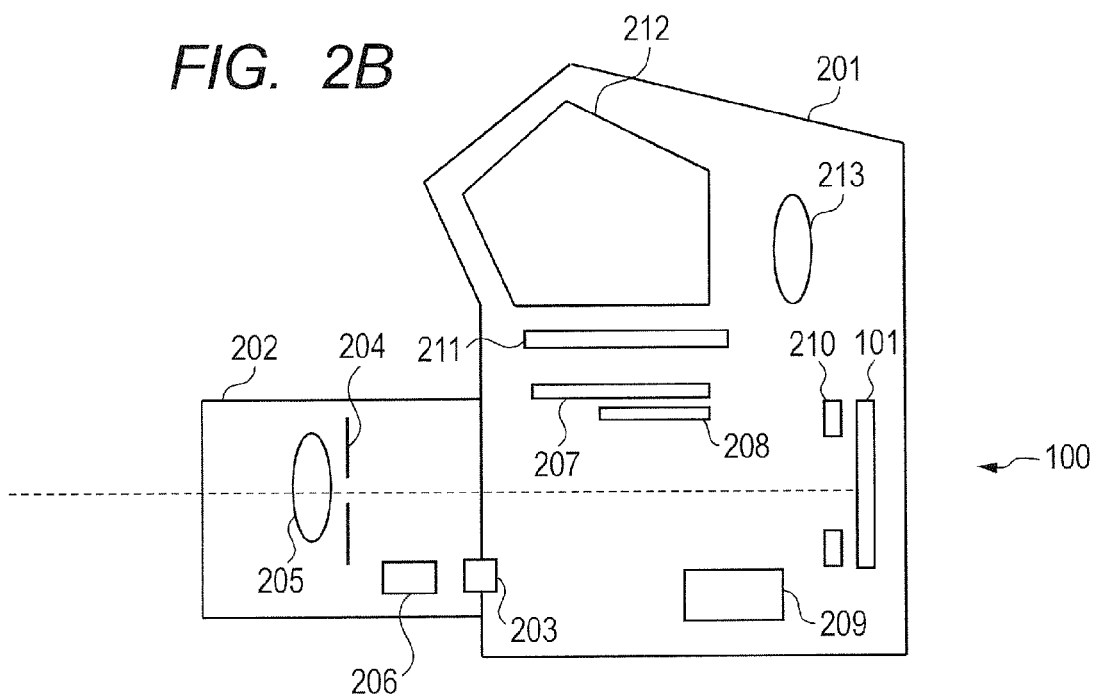

The configuration of the image pickup apparatus 100 according to this embodiment is described next with reference to FIG. 2A and FIG. 2B. FIG. 2A and FIG. 2B are diagrams for illustrating the configuration of the image pickup apparatus 100 according to this embodiment. FIG. 2A and FIG. 2B are side views of the inner part of the image pickup apparatus 100 according to this embodiment. In FIG. 2A, the main mirror 207 and the sub-mirror 208 are in a down position and the focal plane shutter 210 is closed. The user can use an optical finder 215 when the image pickup apparatus 100 is in the state illustrated in FIG. 2A. The optical finder 215 is generally used when a still image is obtained. In FIG. 2B, the main mirror 207 and the sub-mirror 208 are in an up position and the focal plane shutter 210 is open. The main mirror 207, the sub-mirror 208, and the focal plane shutter 210 are set to the state illustrated in FIG. 2B when a moving image is photographed or in live view display. The image pickup apparatus 100 is in the state illustrated in FIG. 2B also when the image pickup element 101 is exposed to photograph a still image.

A photographing lens 202 is attached to the front surface of a main body 201 of the image pickup apparatus 100 as illustrated in FIG. 2B. The photographing lens 202 is detachable from the main body 201 of the image pickup apparatus 100. The photographing lens 202 is electrically connected to the main body 201 of the image pickup apparatus 100 via a mount contact group 203. A diaphragm 204 and a lens group for focus adjustment (focus lens) 205 are arranged inside the photographing lens 202, and are controlled by a lens control unit 206. The photographing lens 202 and a micro-lens 501, which is described later, together make up an image pickup optical system.

The main mirror 207 is arranged inside the main body 201 of the image pickup apparatus 100. A half mirror, for example, is used as the main mirror 207. The main mirror 207 in the state illustrated in FIG. 2A is positioned obliquely on a photographing optical path to reflect light from the photographing lens 202 and lead the light to a finder optical system 214. Light that passes through the main mirror 207, on the other hand, is reflected by the sub-mirror 208 and enters the focus detection element 209. The focus detection element (an AF unit) 209 is an element configured to perform phase difference focus detection, namely, a phase difference AF sensor. AF operation is executed by controlling the lens group for focus adjustment 205 of the photographing lens 202 based on the result of detection of the focus detection element 209.

The image pickup element 101 and the focal plane shutter 210 are arranged inside the main body 201 of the image pickup apparatus 100. The focal plane shutter 210 is usually closed and, only when photographing, opens so that exposure lasting for specified seconds takes place. A focusing screen 211, a pentaprism 212 for changing the optical path, and an eyepiece lens 213 make up the finder optical system 214. The user can check an object image by observing the focusing screen 211 via the eyepiece lens 213.

When a release button (not shown) is pressed halfway down, the first-stage shutter switch (SW1) 110 is switched on. When the first-stage shutter switch 110 is switched on, photographing preparation operation such as automatic exposure (AE) and AF is triggered. When the release button is pressed all the way down, the second-stage shutter switch (SW2) 111 is switched on. When the second-stage shutter switch SW2 is switched on, the main mirror 207 and the sub-mirror 208 move away from the optical path as illustrated in FIG. 2B, and the focal plane shutter 210 subsequently opens for a predetermined length of time to expose the image pickup element 101.

When the operation mode is set to a live view mode, for example, the main mirror 207 and the sub-mirror 208 move away from the optical path, the focal plane shutter 210 opens, and this state is maintained to keep the image pickup element 101 exposed constantly. Signals obtained by the image pickup element 101 are displayed on the display 114, thereby accomplishing live view.

When the operation mode is set to a moving image photographing mode, for example, the main mirror 207, the sub-mirror 208, and the focal plane shutter 210 are set to the same state as in the live view mode.

In the live view mode and the moving image photographing mode, where the sub-mirror 208 is pulled away from the optical path, an object image does not enter the focus detection element 209, and hence phase difference AF using the focus detection element 209 cannot be executed in this state. With the main mirror 207 pulled away from the optical path as well, the object image does not enter the finder optical system 214, which means that the user cannot check the object image by using the optical finder 215.

Figure 3:
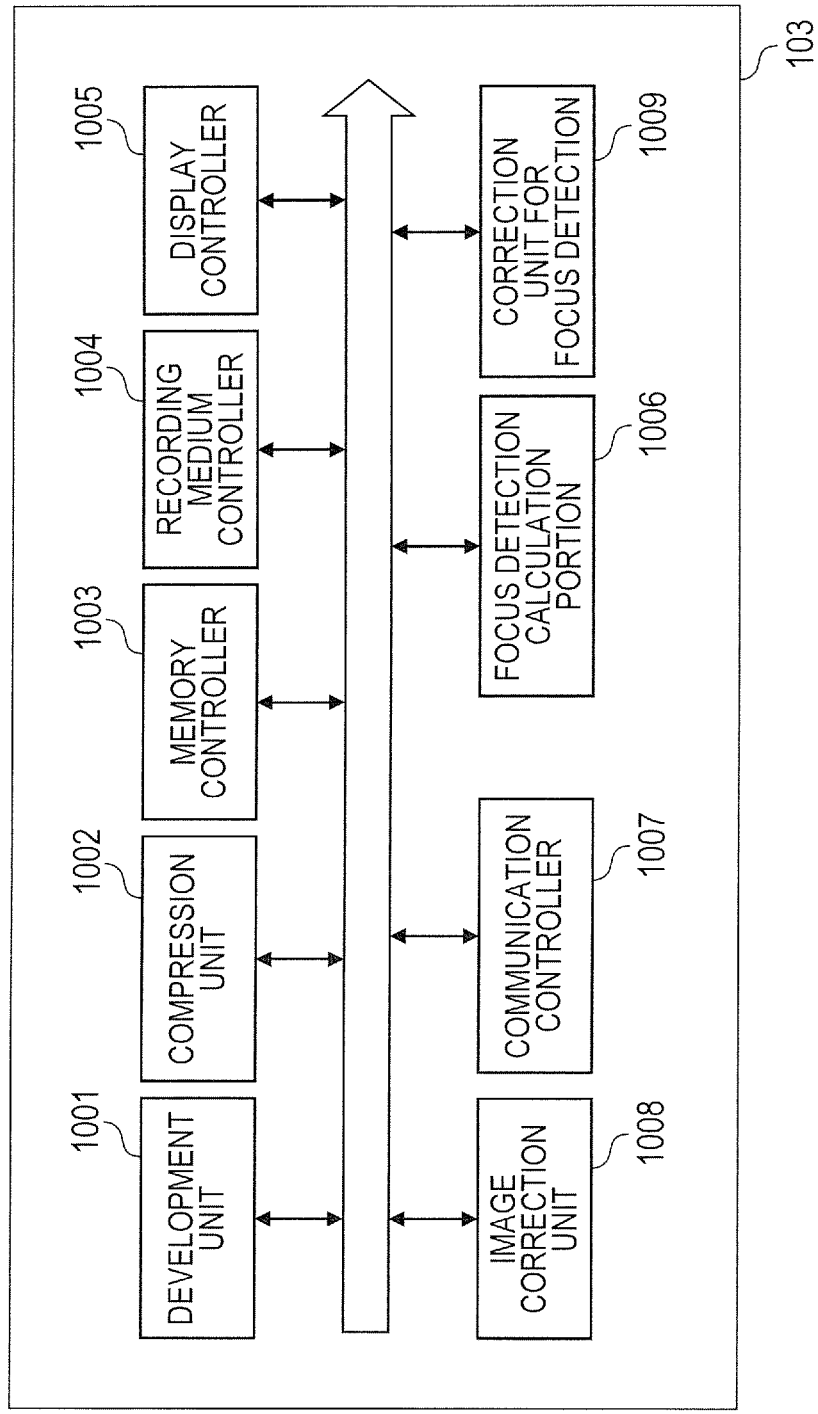
FIG. 3 is a block diagram for illustrating a digital signal processor that is provided in the image pickup apparatus according to the embodiment of the present invention.

FIG. 3 is a block diagram for illustrating the DSP 103, which is provided in the image pickup apparatus 100 according to this embodiment. The DSP 103 includes a development unit 1001, a compression unit 1002, a memory controller 1003, a recording medium controller 1004, a display controller 1005, a focus detection calculation portion 1006, a communication controller 1007, an image correction unit 1008, and a correction unit for focus detection 1009. The focus detection calculation portion 1006 is configured to calculate focus detection information based on an output signal from the focus detection element 209. The communication controller 1007 is configured to hold two-way communication between the DSP 103 and the CPU 105. The focus detection information calculated by the focus detection calculation portion 1006 is transmitted to the CPU 105 via the communication controller 1007.

The image correction unit 1008 is configured to digitally correct a sensitivity error and a dark level error in the image pickup element 101. The correction unit for focus detection 1009 is configured to digitally correct sensitivity errors and dark level errors in the pixels for phase difference detection S1 and S2 before data from the pixels for phase difference detection S1 and S2 is input to the focus detection calculation portion 1006. The correction unit for focus detection 1009 is also configured to digitally correct the focal length of the photographing lens 202 during photographing. The correction unit for focus detection 1009 is also configured to digitally correct the aperture value and other optical conditions in the diaphragm 204.

Figure 4A:
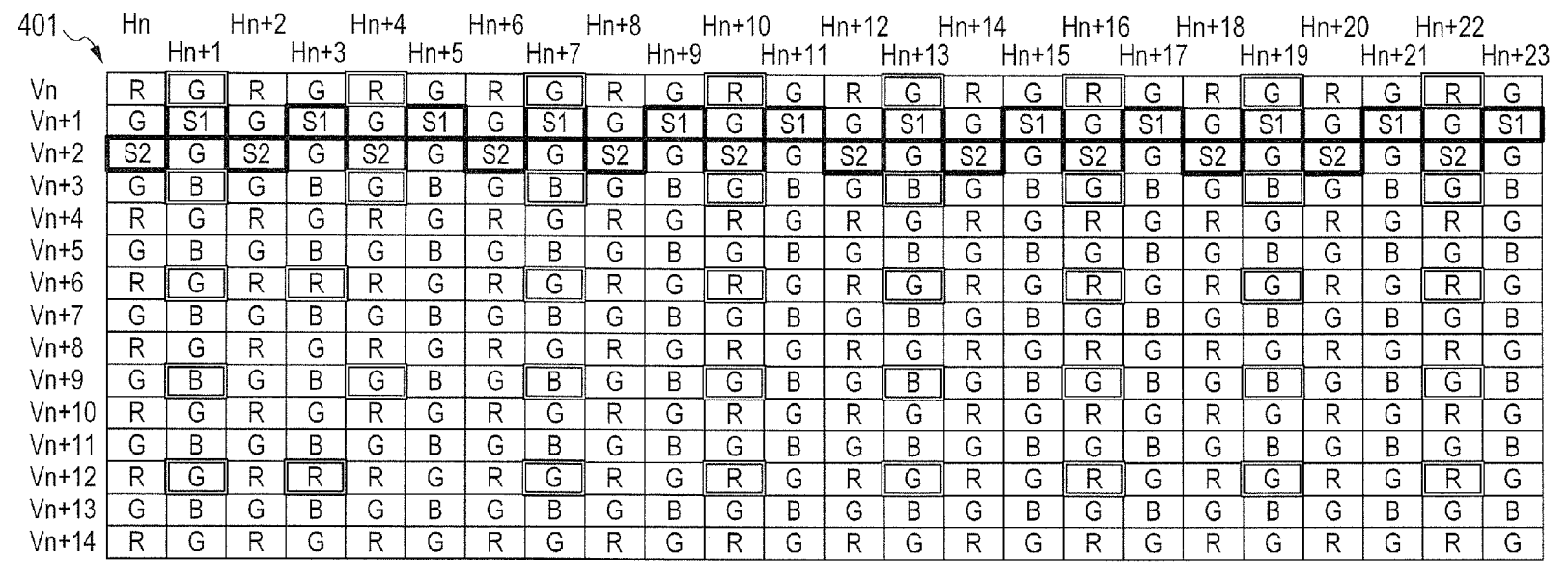
Figure 4B:
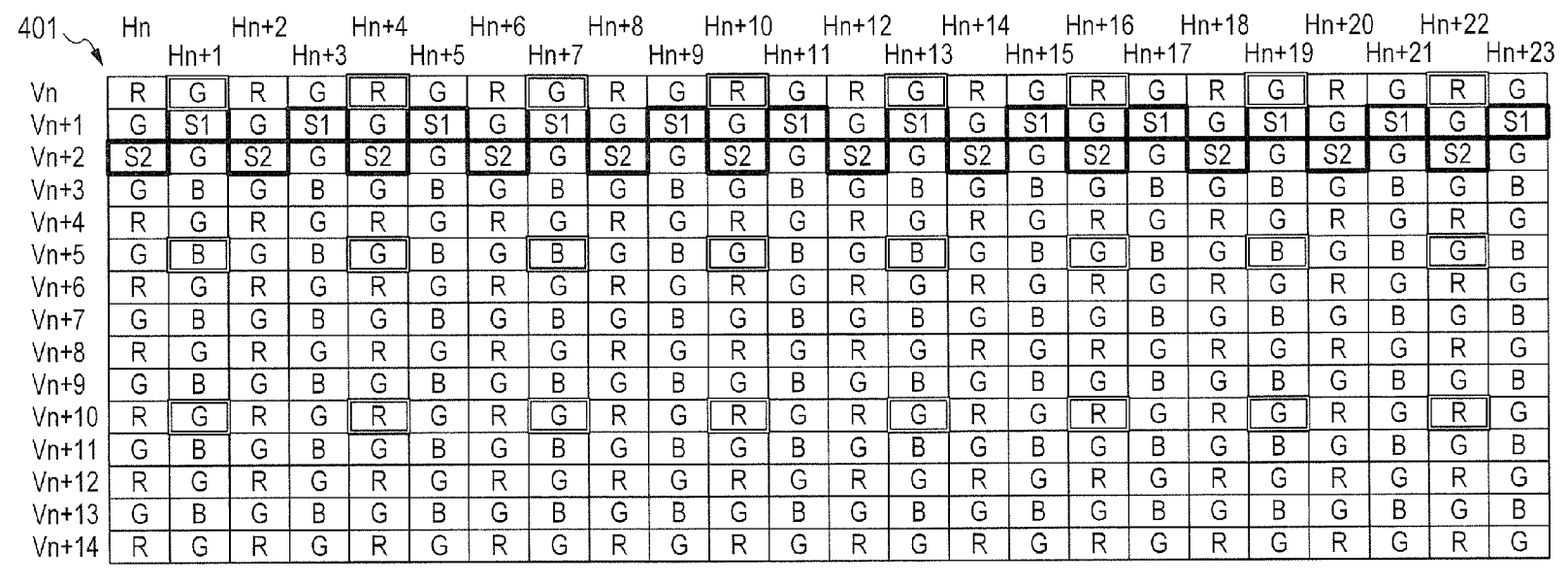

FIG. 4A and FIG. 4B are diagrams for illustrating an example of the layout of pixels in the image pickup element 101. In FIG. 4A and FIG. 4B, "R" represents a normal pixel that has a red color filter arranged therein, "G" represents a normal pixel that has a green color filter arranged therein, and "B" represents a normal pixel that has a blue color filter arranged therein. Normal pixels R, G, and B are pixels used to obtain a moving image, a still image, and the like, and differ from the pixels for phase difference detection S1 and S2, which are described later. One basic block 401 made up of fifteen rows by twenty-four columns of pixels is illustrated in FIG. 4A and FIG. 4B. Basic blocks 401 in which pixels are arranged in this pattern are arranged in a pixel portion 701 (see FIG. 8) of the image pickup element 101 in a repetitive pattern that is repeated in a horizontal direction and a vertical direction. In FIG. 4A and FIG. 4B, "S1" and "S2" represent pixels that are used for phase difference focus detection, namely, pixels for phase difference detection (pixels for focus detection).

FIG. 5A to FIG. 5C are sectional views for illustrating pixels arranged in the image pickup element 101. In FIG. 5A, a first pixel for phase difference detection S1 is illustrated. A second pixel for phase difference detection S2 is illustrated in FIG. 5B. Normal pixels R, G, and B are illustrated in FIG. 5C. The pixels R, G, B, S1, and S2 each include a photoelectric converter (photo diode) 504. The photoelectric converter 504 is formed within a substrate (not shown). In each of the pixels for phase difference detection S1 and S2, a light shielding layer 503 is formed on the substrate where the photoelectric converter 504 is formed. The light shielding layer 503 is not formed in the normal pixels R, G, and B. The light shielding layer 503 is formed from an aluminum film or other films that have a light shielding property. The light shielding layer 503 is embedded in a leveling layer 502. Formed on the leveling layer 502 is the micro-lens 501. As illustrated in FIG. 5A, the light shielding layer 503 in the first pixel for phase difference detection S1 has a slit 508*a*, which is formed to regulate the incidence direction of incident light. As illustrated in FIG. 5B, the light shielding layer 503 in the second pixel for phase difference detection S2 has a slit 508*b*, which is formed to regulate the incidence direction of incident light. The position of a center 506 of the slit 508*a* in the first pixel for phase difference detection S1 is offset to the left side of the sheet of the drawing with respect to an optical axis center 505 of the first pixel for phase difference detection S1. The position of a center 507 of the slit 508*b* in the second pixel for phase difference detection S2 is offset to the right side of the sheet of the drawing with respect to the optical axis center 505 of the second pixel for phase difference detection S2. In this way, the offset direction of the slit 508*a* in the pixel for phase difference detection S1 and the offset direction of the slit 508*b* in the pixel for phase difference detection S2 are opposite from each other.

FIG. 6A to FIG. 6C are each a diagram for schematically illustrating the relationship between a light flux that passes through an exit pupil 509 of the image pickup optical system and one type of pixel. Illustrated in FIG. 6A is the relationship between a light flux that passes through a first pupil area 510, which is a partial area of the exit pupil 509 of the image pickup optical system, and the first pixel for phase difference detection S1. As described above, the slit 508*a* in the first pixel for phase difference detection S1 is offset to the left side of the sheet of the drawing. The light flux passing through the first pupil area 510 accordingly enters the first pixel for phase difference detection S1 via the slit 508*a*. The first pixel for phase difference detection S1 therefore outputs a signal generated based on the light flux that passes through the first pupil area 510, which is a part of the exit pupil 509 of the image pickup optical system. Illustrated in FIG. 6B is the relationship between a light flux that passes through a second pupil area 511, which is another part of the exit pupil 509 of the image pickup optical system and which differs from the first pupil area 510, and the second pixel for phase difference detection S2. As described above, the slit 508*b* in the second pixel for phase difference detection S2 is offset to the right side of the sheet of the drawing. The light flux passing through the second pupil area 511 accordingly enters the second pixel for phase difference detection S2 via the slit 508*b*. The second pixel for phase difference detection S2 therefore outputs a signal generated based on the light flux that passes through the second pupil area 511, which is a part of the exit pupil 509 of the image pickup optical system. Illustrated in FIG. 6C is the relationship between a light flux that passes through the exit pupil 509 of the image pickup optical system and the normal pixels R, G, and B. The light shielding layer 503 is not formed in the normal pixels R, G, and B as described above. This means that a light flux that passes through the entire area of the exit pupil 509 of the image pickup optical system enters the normal pixels R, G, and B. Each of the normal pixels R, G, and B therefore outputs a signal generated based on the light flux that passes through the entire area of the exit pupil 509. The pixels for phase difference detection S1 and S2 each including the photoelectric converter 504, the light shielding layer 503, and the micro-lens 501 are configured in this manner. The normal pixels R, G, and B each including the photoelectric converter 504 and the micro-lens 501 are configured in the described manner.

In the layout example illustrated in FIG. 4A, a first pixel group for phase difference detection, which is made up of a plurality of first pixels for phase difference detection S1, is arranged in an (n+1)th row Vn+1. A second pixel group for phase difference detection, which is made up of a plurality of second pixels for phase difference detection S2, is arranged in an (n+2)th row Vn+2. The pixel group for phase difference detection made up of a plurality of pixels for phase difference detection S1 and the pixel group for phase difference detection made up of a plurality of pixels for phase difference detection S2, which are arranged in the row Vn+1 and the row Vn+2, respectively, correspond to one AF frame (AF area). A phase difference between image data obtained by the first pixel for phase difference detection S1 and image data obtained by the second pixel for phase difference detection S2 is detected, to thereby enable calculation of information about the distance to an object. An object image that is obtained by the first pixel group for phase difference detection, which is made up of a plurality of first pixels for phase difference detection S1 arranged regularly in a horizontal direction, is referred to as, for example, "image A". An object image that is obtained by the second pixel group for phase difference detection, which is made up of a plurality of second pixels for phase difference detection S2 arranged regularly in a horizontal direction, is referred to as, for example, "image B". An out-of-focus (defocus amount) of the object image can be detected by detecting the relative positions of the image A and the image B.

Figure 7:
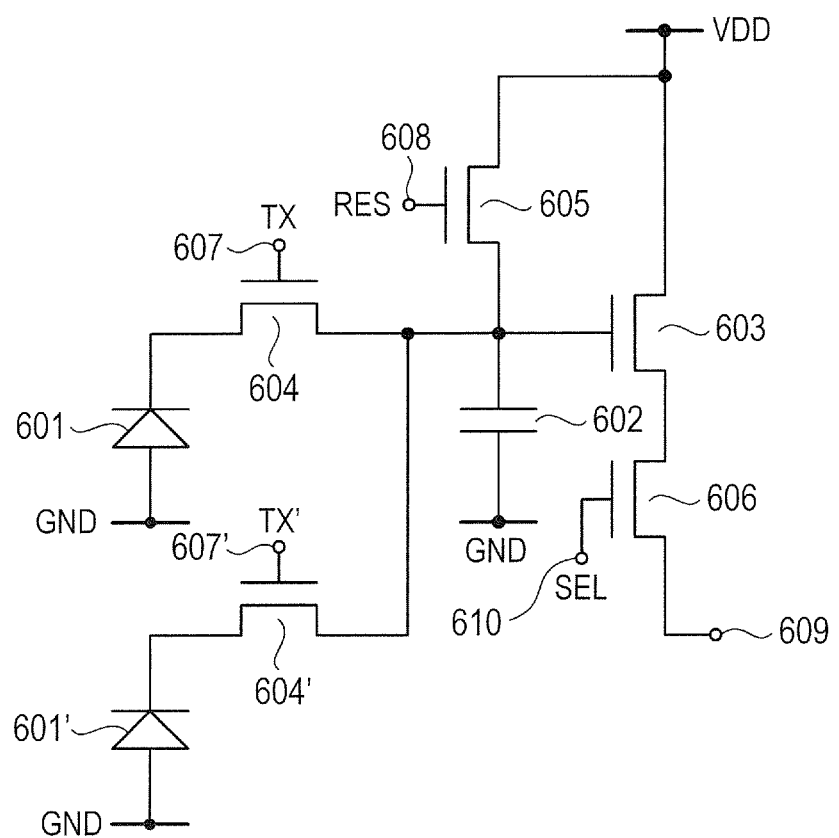
FIG. 7 is a circuit diagram of a pixel portion of the image pickup element.

FIG. 7 is a circuit diagram of the pixel portion of the image pickup element 101. In this embodiment, two pixels adjacent to each other in a vertical direction share a floating diffusion area (FD area) 602 and circuit components downstream of the FD area 602. A configuration in which the FD area, namely, a floating diffusion capacitance, is shared is called a floating diffusion sharing configuration (FD sharing configuration).

As illustrated in FIG. 7, photoelectric converters 601 and 601' are respectively arranged in two pixels adjacent to each other in the vertical direction. The photoelectric converters 601 and 601' each receive light that has passed through the micro-lens 501 and other components, and generates electric charges (signal charges) in an amount calculated based on the amount of the received light. Anodes of the photoelectric converters 601 and 601' are each connected to a ground GND, and cathodes of the photoelectric converters 601 and 601' are connected to transfer switches (transfer gates) 607 and 607', respectively. A transfer switch 604 is for transferring electric charges generated in the photoelectric converter 601 to the FD area 602. A transfer switch 604' is for transferring electric charges generated in the photoelectric converter 601' to the FD area 602. The transfer switches 604 and 604' are connected to the shared FD area 602. The transfer switches 604 and 604' are controlled by transfer signals TX and TX', respectively.

The FD area 602 temporarily stores electric charges transferred from the photoelectric converters 601 and 601', and also functions as a charge-to-voltage conversion portion configured to convert held charges into a voltage signal. The FD area 602 is connected to a reset switch 605 and an amplifier transistor (a MOS transistor) 603. The reset switch 605 is for resetting the photoelectric converters 601 and 601'. The reset switch 605 is controlled by a reset signal RES. A level of voltage that is determined based on electric charges held in the FD area 602 is applied to a gate of the amplifier transistor 603. The FD area 602 and the amplifier transistor 603 make up a floating diffusion amplifier configured to convert signal charges that are accumulated in the photoelectric converters 601 and 601' into a voltage. The amplifier transistor 603 is connected to a current source (current source transistor) (not shown) via a selection switch 606, an output node 609, and a vertical output line (an output signal line) (not shown), thereby making up as a source follower. A drain of the amplifier transistor 603 is connected to a reference potential VDD. The selection switch 606 is for selecting a pixel. The selection by the selection switch 606 is made by a selection signal SEL.

The gate 607 of the transfer switch 604 is connected to a shared signal line (not shown) that is used to control the transfer signal TX. The gate 607' of the transfer switch 604' is connected to a shared signal line (not shown) that is used to control the transfer signal TX'. A gate 608 of the reset switch 605 is connected to a shared signal line (not shown) that is used to control the reset signal RES. The output node 609 is connected to the vertical output line (not shown) through which an output signal of the floating diffusion amplifier is output. The floating diffusion amplifier outputs an output signal via the vertical output line at a magnitude that is determined based on the electric potential of the gate of the amplifier transistor 603. A gate 610 of the selection switch 606 is connected to a signal line that (not shown) is used to control the selection signal SEL.

Figure 8:
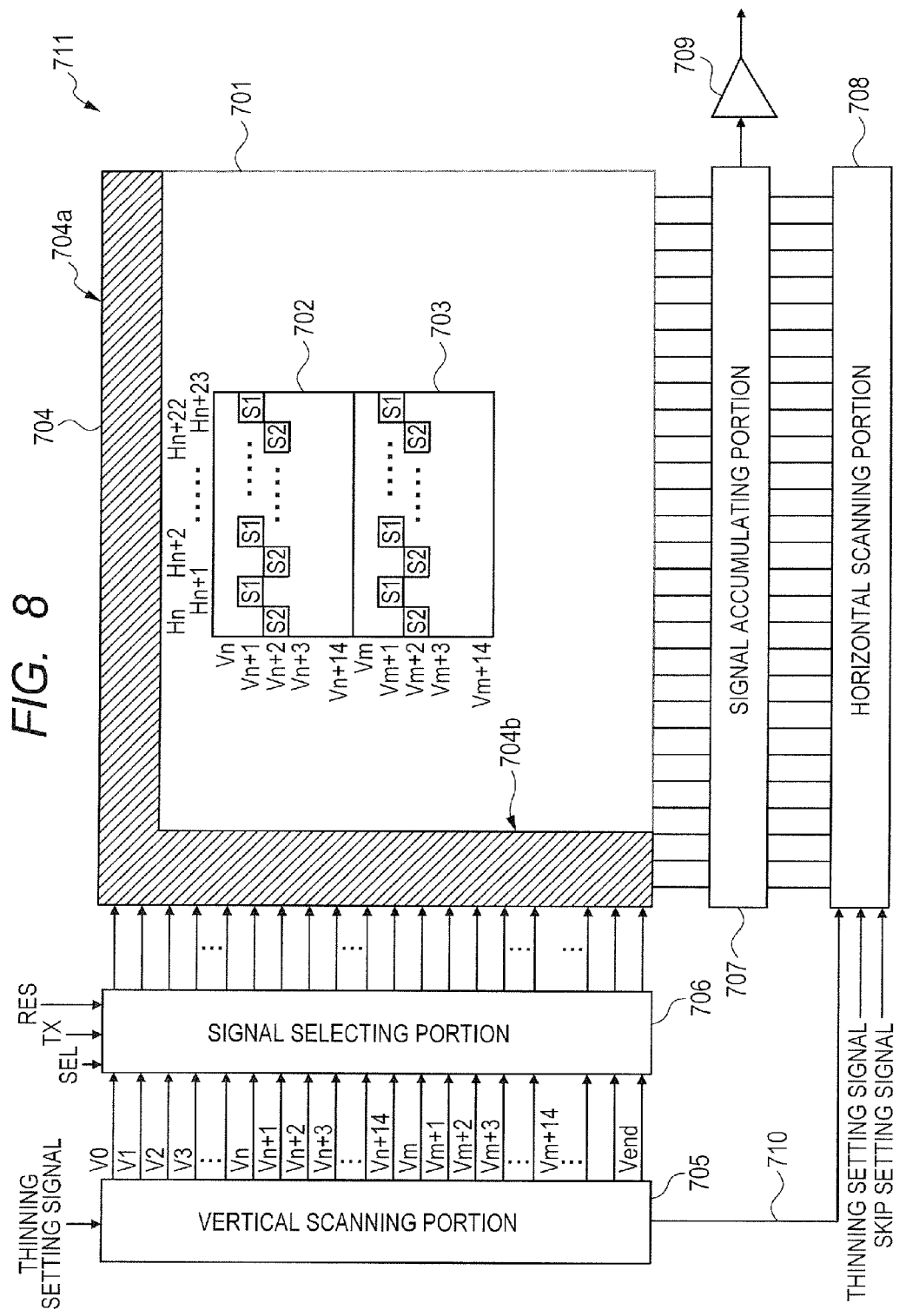
FIG. 8 is a schematic diagram for illustrating the configuration of the image pickup element.

FIG. 8 is a schematic diagram for illustrating an example of the configuration of the image pickup element 101. A pixel array portion 711 of the image pickup element 101 has a plurality of pixels arranged into a matrix pattern. The pixel array portion 711 is provided with the pixel portion 701 and an optical black (OB) portion 704. In the pixel portion 701, the basic blocks 401 described above with reference to FIG. 4A and FIG. 4B are arranged in a repetitive pattern that is repeated in a horizontal direction and a vertical direction. Two basic blocks 401 out of the plurality of basic blocks 401 arranged in a repetitive pattern that is repeated in a horizontal direction and a vertical direction are illustrated in FIG. 8 and denoted by reference symbols 702 and 703. Other basic blocks 401 than the basic blocks 702 and 703 out of the plurality of basic blocks 401 arranged in the pixel portion 701 are omitted from FIG. 8. The basic block 702 is made up of a plurality of pixels located in an n-th row Vn to an (n+14)th row Vn+14, and in an n-th column Hn to an (n+23)th column Hn+23. The basic block 703 is made up of a plurality of pixels located in an m-th row Vm to an (m+14)th row Vm+14, and in the n-th column Hn to the (n+23)th column Hn+23. The OB portion 704 in FIG. 8 is hatched. The OB portion 704 has a plurality of pixels shielded from light. The OB portion 704 is arranged next to the pixel portion 701, and the pixels formed in the OB portion 704, namely, light-shielded pixels, are used to define the color black in a photographed image. Data output from the pixels of the OB portion 704, namely, OB data, takes a value larger than 0 due to noise, and an average value of OB data is a value larger than 0 as well. The lowest pixel value in a photographed image is not always 0 because noise similar to that of OB data is mixed in the photographed image. The photographed image is therefore corrected by subtracting an average value of OB data from the photographed image. The correction makes the value of pixels where no incident light has been observed substantially 0. The plurality of pixels arranged in the OB portion 704, namely, light-shielded pixels, are referred to as "OB pixels". The OB portion 704 includes a VOB portion 704a in which OB pixels are arranged in a horizontal direction and an HOB portion 704b in which OB pixels are arranged in a vertical direction. Pixel signal fluctuations from column to column are corrected based on output signals from the VOB portion 704a in which OB pixels are arranged in a horizontal direction, and pixel signal fluctuations from row to row are corrected based on output signals from the HOB portion 704b in which OB pixels are arranged in a vertical direction.

A vertical scanning portion (vertical scanning circuit) 705 is configured to output scanning signals sequentially, thereby controlling the reading of signals from pixels that are formed in the pixel array portion 711 row by row. A thinning setting signal for setting thinning operation that is executed in vertical scanning is input to the vertical scanning portion 705 from the timing generator 104. The vertical scanning portion 705 and other components function as a part of a row selecting unit configured to select a row that is to be read.

Pixel control signals supplied from the timing generator 104, namely, the reset signal RES, the transfer signal TX, and the selection signal SEL, are input to a signal selecting portion 706. One of the pixel control signals is output from the signal selecting portion 706 to a row that is specified by a scanning signal output from the vertical scanning portion 705. Signals from pixels that are located in the selected row are input to a signal accumulating portion 707 via a vertical output line. The signal accumulating portion 707 is configured to accumulate signals from pixels that are located in a selected row, namely, pixel signals.

A horizontal scanning portion 708 is configured to select, one at a time, pixel signals accumulated in the signal accumulating portion 707, and to output the selected pixel signal to the outside of the image pickup element 101 via an output amplifier 709. A thinning setting signal for setting thinning operation that is executed in horizontal scanning and a skip setting signal for setting skipping in horizontal scanning are supplied to the horizontal scanning portion 708 from the timing generator 104. The horizontal scanning portion 708 is also supplied with a control signal 710 from the vertical scanning portion 705 in order to control operation in a particular row. The horizontal scanning portion 708 and the signal accumulating portion 707 can function as a part of a reading unit configured to read a signal that is generated based on the voltage of the FD area 602 of a pixel that is located in a row selected by the vertical scanning portion 705 and other components.

Figure 9:
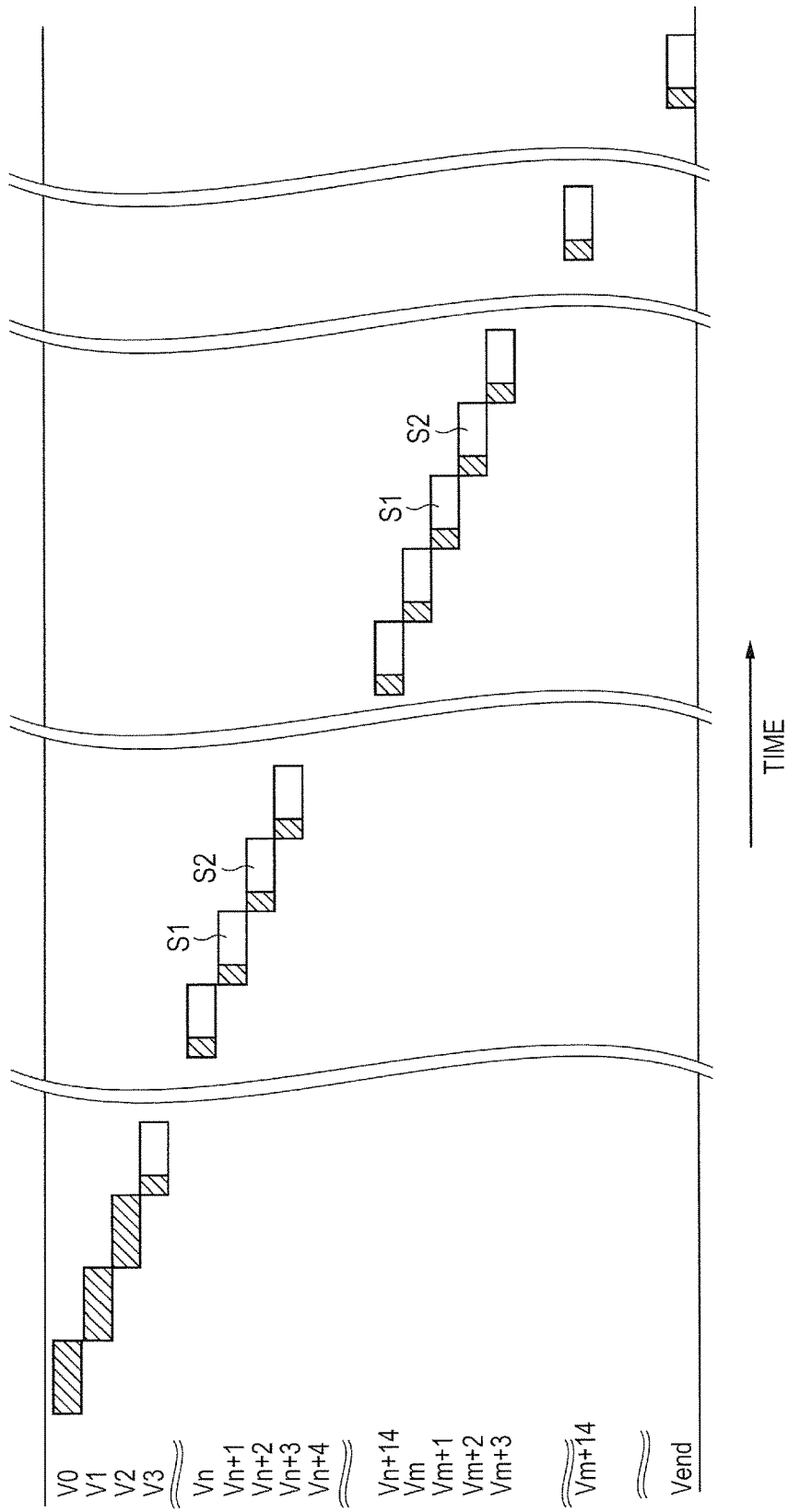
FIG. 9 is a diagram for illustrating an example of a time chart that is followed to obtain a still image.

FIG. 9 is a diagram for illustrating an example of a time chart that is followed to photograph a still image. A reading mode in which a signal is read from every pixel located in the pixel portion 701 is referred to as "all-pixel reading mode". The description given here takes a case of photographing a still image in the all-pixel reading mode as an example. The horizontal axis in FIG. 9 represents time and, for each row, a time at which reading operation is executed in the row is indicated by a frame corresponding to the row. A hatched portion inside the frame indicates that a signal is being read from the OB portion 704.

A moving image photographing mode for photographing a moving image has two options to select from and set, that is, a "high definition mode" in which high definition moving image data is obtained and a "high speed mode" in which moving image data having a high frame rate is obtained. The user selects one of the "high definition mode" and the "high speed mode" by operating the mode dial 112. The "high definition mode" involves thinning reading in which a signal is read for every three pixels in the horizontal direction and the vertical direction both. The "high speed mode" involves thinning reading in which a signal is read for every three pixels in the horizontal direction and a signal is read for every five pixels in the vertical direction. In the "high definition mode" where the number of pixels read is larger than the number of pixels read in the "high speed mode", the definition of obtained moving image data is higher than in the "high speed mode". In the "high speed mode" where the number of pixels read is smaller than the number of pixels read in the "high definition mode", the frame rate of obtained moving image data is higher than in the "high definition mode".

When a moving image is photographed in the "high definition mode", the image size of one frame, namely, the pixel count of one frame, is 1,920×1,080 pixels, for example, and the frame rate is 30 fps, for example. When a moving image is photographed in the "high speed mode", on the other hand, the image size of one frame, namely, the pixel count of one frame, is 1,080×720 pixels, for example, and the frame rate is 60 fps, for example.

In the "high definition mode", which is a first mode, a signal is read for every three pixels in the vertical direction and the horizontal direction both. To give an example with reference to FIG. 4A, output from each pixel that is surrounded by the double line is read in the "high definition mode". In the case of the basic block 702 of FIG. 8, output is read from each pixel that is located in one of the columns Hn+1, Hn+4, Hn+7, Hn+10, Hn+13, Hn+16, Hn+19, and Hn+22 and also located in one of the rows Vn, Vn+3, Vn+6, Vn+9, and Vn+12. In the case of the basic block 703 of FIG. 8, output is read from each pixel that is located in one of the columns Hm+1, Hm+4, Hm+7, Hm+10, Hm+13, Hm+16, Hm+19, and Hm+22 and also located in one of the rows Vn, Vn+3, Vn+6, Vn+9, and Vn+12.

In the reading described above, no signals are read from the (n+1)th row Vn+1 and the (n+2)th row Vn+2. This means that no signals are read from the pixel for phase difference detection S1 located in the (n+1)th row Vn+1 and the pixel for phase difference detection S2 located in the (n+2)th row Vn+2. When signals from the pixels for phase difference detection S1 and S2 are not read, phase difference focus detection that uses signals from the pixels for phase difference detection S1 and S2 cannot be executed. For that reason, first scanning in which the thinning reading described above is performed on normal pixels is followed, after completion, by second scanning in which signals from the pixels for phase difference detection S1 and S2 are read as illustrated in FIG. 10A to FIG. 10C.

FIG. 10A to FIG. 10C are diagrams for illustrating an example of reading operation that is executed when a moving image is obtained in the high definition mode. In FIG. 10A to FIG. 10C, the horizontal axis represents time and, for each row, a time at which reading is executed in the row is indicated by a frame corresponding to the row. A hatched portion inside the frame indicates that a signal is being read from the OB portion 704. After the first scanning is finished for rows up through a row Vend-2, which is the third row to the last row, the second scanning is executed to read rows where the pixels for phase difference detection S1 and S2 are located. In the second scanning, signals are read sequentially out of the pixels for phase difference detection S1 and S2 located in, for example, the (n+1)th row Vn+1, the (n+2)th row Vn+2, an (m+1)th row Vm+1, and an (m+2)th row Vm+2. One frame of images is read in the "high definition mode" in this manner.

The description given above takes the reading of signals from two basic blocks 702 and 703 as an example. In the example described above, the pixel for phase difference detection S1 is located in the (n+1)th row Vn+1, the pixel for phase difference detection S2 is located in the (n+2)th row Vn+2, another pixel for phase difference detection S1 is located in the (m+1)th row Vm+1, and another pixel for phase difference detection S2 is located in the (m+2)th row Vm+2. However, the number of basic blocks (here, 702 and 703) where signals are read is not limited to two, and the arrangement of the pixels for phase difference detection S1 and S2 in the basic blocks 702 and 703 is not limited to the placement in the described example. The description applies to any cases as long as the second scanning in which the pixels for phase difference detection S1 and S2 are read is executed after the first scanning in which thinning reading is performed on normal pixels. Rows in FIG. 10B are sorted in an order in which signals are read. FIG. 10C is an illustration of the arrangement of pieces of data read from the respective rows.

The "high definition mode" thus involves the thinning reading of normal pixels in which a signal is read for, for example, every three pixels in the vertical direction and a signal is read for, for example, every three pixels in the horizontal direction. Signals obtained by the first scanning executed in this manner, namely, image data, is used to generate a moving image. Signals obtained in the second scanning from the pixels for phase difference detection S1 and S2 are not used in the generation of a moving image. Signals read out of the pixels for phase difference detection S1 and S2 are used to execute focus detection processing.

In the "high speed mode", which is a second mode, a signal is read for every five normal pixels in the vertical direction and a signal is read for every three normal pixel in the horizontal direction. To give an example with reference to FIG. 4B, output from each pixel that is surrounded by the double line is read in the "high speed mode". In the case of the basic block 702 of FIG. 8, output is read from each pixel that is located in one of the columns Hn+1, Hn+4, Hn+7, Hn+10, Hn+13, Hn+16, Hn+19, and Hn+22 and also located in one of the rows Vn, Vn+5, and Vn+10. In the case of the basic block 703 of FIG. 8, output is read from each pixel that is located in one of the columns Hm+1, Hm+4, Hm+7, Hm+10, Hm+13, Hm+16, Hm+19, and Hm+22 and also located in one of the rows Vn, Vn+5, and Vn+10.

Thus, in the "high speed mode", no signals are read from the (n+1)th row Vn+1 and the (n+2)th row Vn+2 as in the "high definition mode". This means that no signals are read from the pixel for phase difference detection S1 located in the (n+1)th row Vn+1 and the pixel for phase difference detection S2 located in the (n+2)th row Vn+2 in the "high speed mode" either. When signals from the pixels for phase difference detection S1 and S2 are not read, phase difference focus detection that uses signals from the pixels for phase difference detection S1 and S2 cannot be executed. For that reason, as in the "high definition mode", the first scanning in which the thinning reading described above is performed on normal pixels is followed in the "high speed mode" by the second scanning in which signals from the pixels for phase difference detection S1 and S2 are read as illustrated in FIG. 11A to FIG. 11C.

FIG. 11A to FIG. 11C are diagrams for illustrating an example of reading operation that is executed when a moving image is obtained in the "high speed mode". In FIG. 11A to FIG. 11C, the horizontal axis represents time and, for each row, a time at which reading is executed in the row is indicated by a frame corresponding to the row. A hatched portion inside the frame indicates that a signal is being read from the OB portion 704.

After the first scanning is finished for rows up through a row Vend-5, which is the sixth row to the last row, the second scanning is executed to read rows where the pixels for phase difference detection S1 and S2 are located. In the second scanning, signals are read sequentially out of the pixels for phase difference detection S1 and S2 located in, for example, the (n+1)th row Vn+1, the (n+2)th row Vn+2, the (m+1)th row Vm+1, and the (m+2)th row Vm+2. One frame of images is read in the "high speed mode" in this manner. Rows in FIG. 11B are sorted in an order in which signals are read. FIG. 11C is an illustration of the arrangement of pieces of data read from the respective rows.

The "high speed mode" drops more pixels for thinning reading in the vertical direction and accordingly has fewer pixels to read than the "high definition mode" does. The "high speed mode" is therefore capable of reading in a shorter time, although the image resolution is lower than in the "high definition mode". In the "high definition mode" and the "high speed mode" both, the pixels for phase difference detection S1 and S2 are arranged in rows that are not read in the first scanning.

Figure 12A:
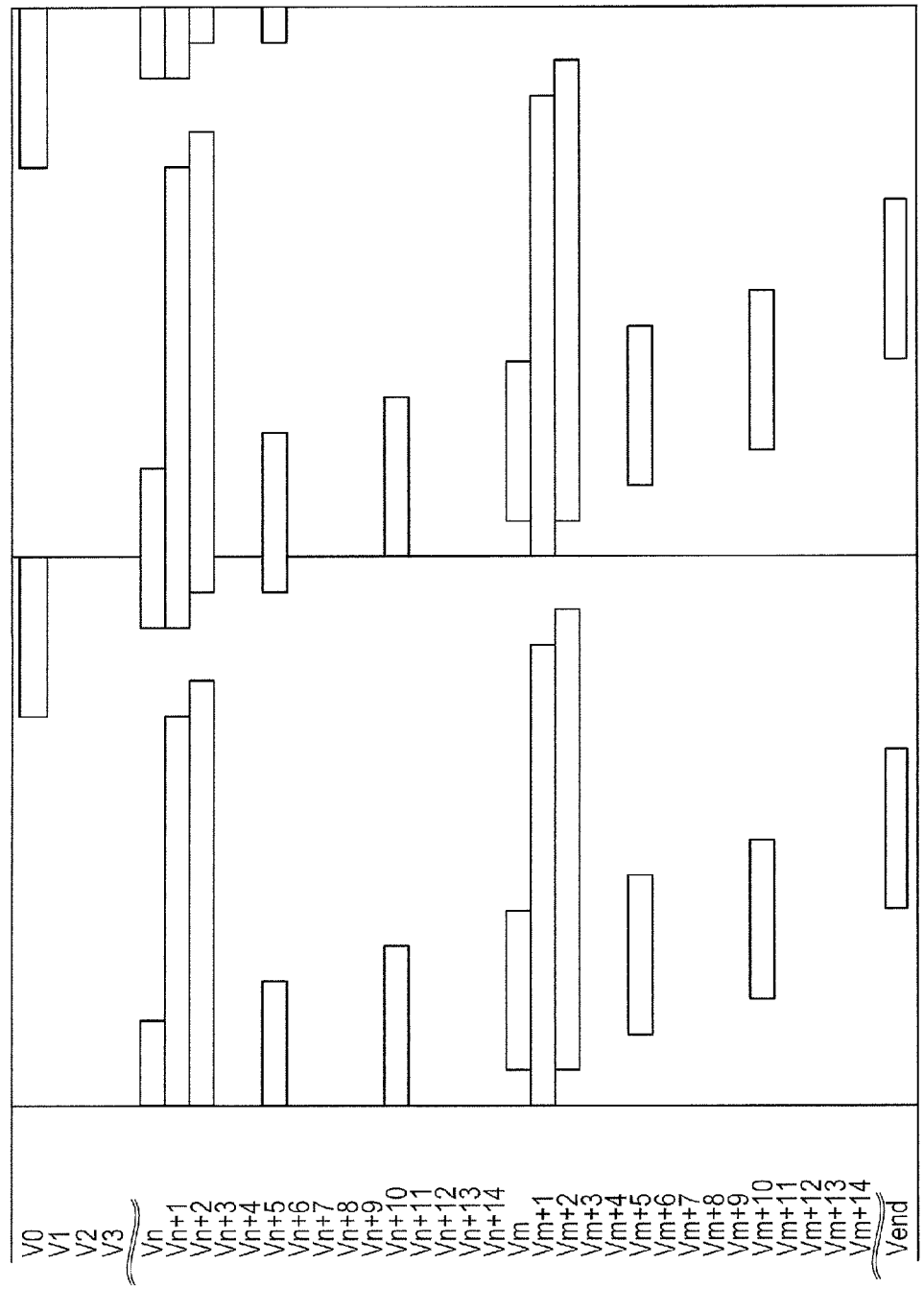
FIG. 12A, FIG. 12B and FIG. 12C are diagrams for illustrating an example of reading operation that is executed when a moving image is obtained.
Figure 12B:
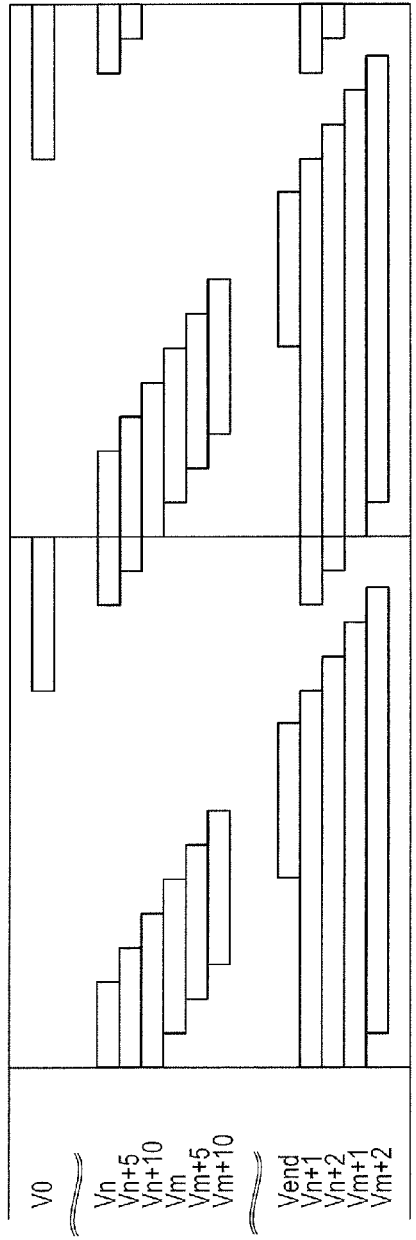
Figure 12C:
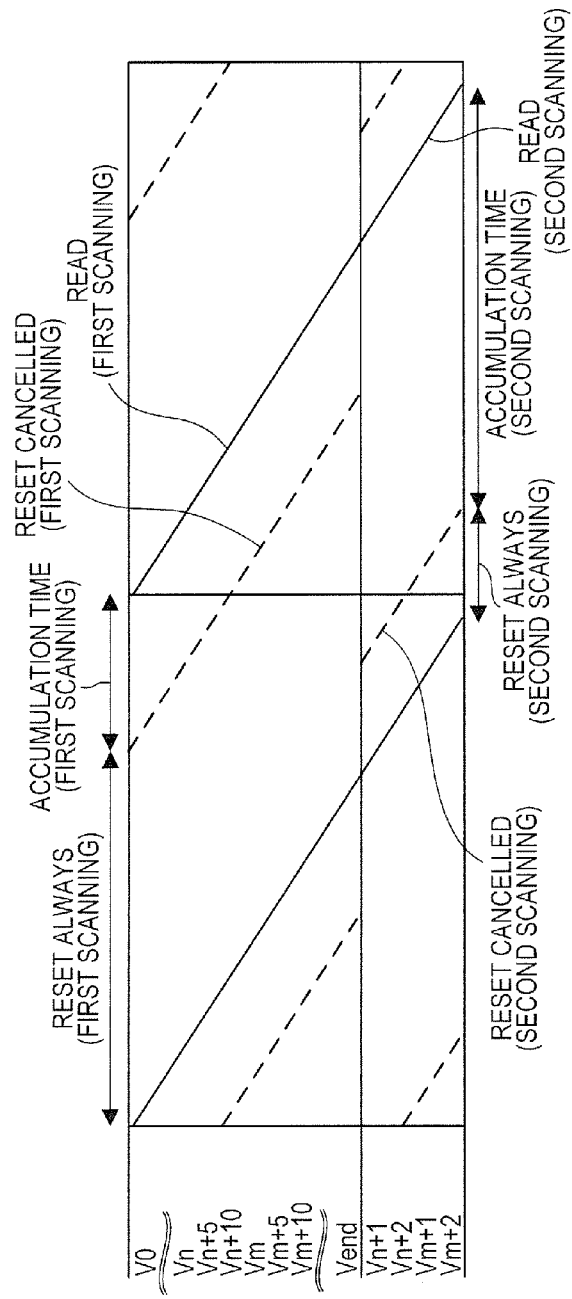

FIG. 12A to FIG. 12C are diagrams for illustrating an example of reading operation that is executed when a moving image is obtained. The horizontal axis in FIG. 12A to FIG. 12C represents time. In FIG. 12A and FIG. 12B, each row has a corresponding frame that indicates an accumulation period (accumulation time) in pixels of the row. The left end and right end of the frame schematically express timing at which reset is cancelled for the pixels and timing at which reading is started for the pixels, respectively. The accumulation period (accumulation time) is a period (time) in which electric charges corresponding to signals that are read in the first scanning or the second scanning are accumulated in relevant pixels. The operation of FIG. 12A to FIG. 12C in the first scanning in which thinning reading is performed on normal pixels is basically the same as in FIG. 11A to FIG. 11C. In the case illustrated in FIG. 12A to FIG. 12C, however, the accumulation time (accumulation period) in rows where signals from normal pixels are read and the accumulation time in rows where signals from the pixels for phase difference detection S1 and S2 are read are set separately from each other. In the first scanning where thinning reading is executed, the vertical scanning portion 705 scans, for example, the n-th row Vn, the (n+5)th row Vn+5, the (n+10)th row Vn+10, the m-th row Vm, the (m+5)th row Vm+5, and an (m+10)th row Vm+10. In the second scanning where signals are read out of the pixels for phase difference detection S1 and S2, the vertical scanning portion 705 scans the rows Vn+1, Vn+2, Vm+1, and Vm+2 in which the pixels for phase difference detection S1 and S2 are located. The oblique solid line in FIG. 12C indicates the timing of reading, and the oblique broken line in FIG. 12C indicates the timing of reset cancellation, which is executed prior to reading operation. Reset cancellation for rows from which moving image data is obtained and reset cancellation for rows from which data for focus detection is obtained can be executed independently of each other as illustrated in FIG. 12C because control lines of the transfer signal TX, the reset signal RES, and the selection signal SEL are provided for each row. By varying the timing of reset cancellation for rows from which a moving image is obtained and for rows from which data for focus detection is obtained, different accumulation times can be set for the former rows and the latter rows. In the case illustrated in FIG. 12A to FIG. 12C, the accumulation time in pixels located in rows that are selected in the second scanning is set longer than the accumulation time in pixels located in rows that are selected in the first scanning. It is effective to set a relatively long accumulation time in pixels located in rows that are selected in the second scanning as in FIG. 12A to FIG. 12C when, for example, a focus detection area is dark in places.

Figure 13B:
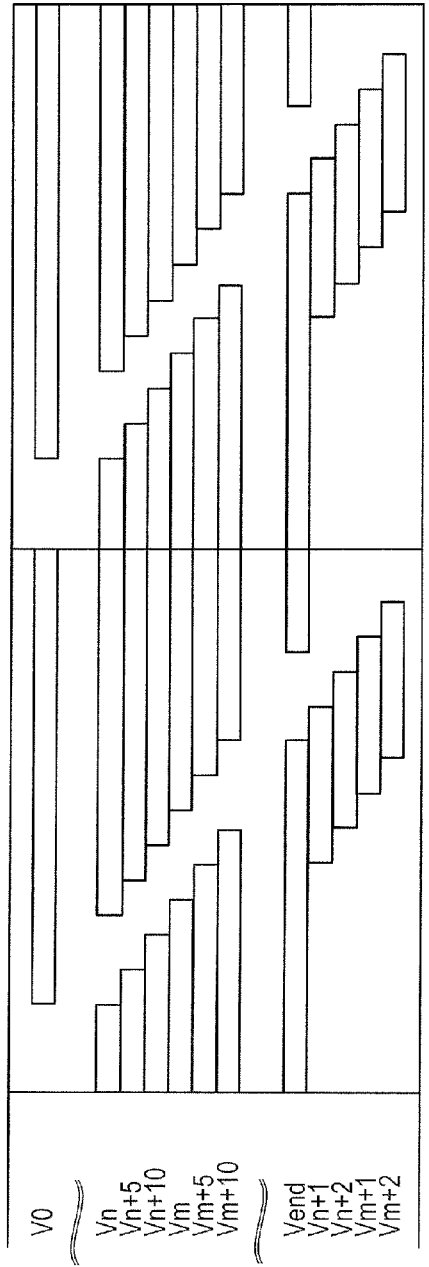
Figure 13C:
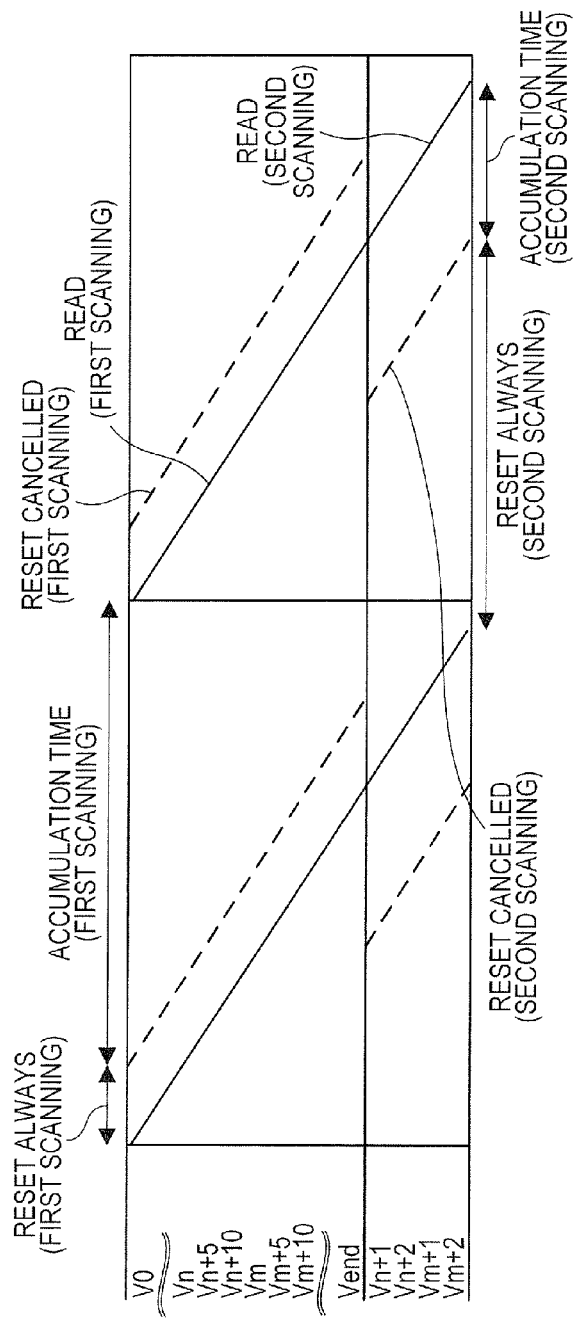

FIG. 13A to FIG. 13C are diagrams for illustrating an example of reading operation that is executed when a moving image is obtained. Illustrated in FIG. 13A to FIG. 13C is a case in which an accumulation time set to pixels located in rows that are read in the second scanning is shorter than the accumulation time in pixels located in rows that are read in the first scanning. It is effective to set a relatively short accumulation time in pixels located in rows that are selected in the second scanning as in FIG. 13A to FIG. 13C when, for example, a focus detection area is bright in places.

Figure 14:
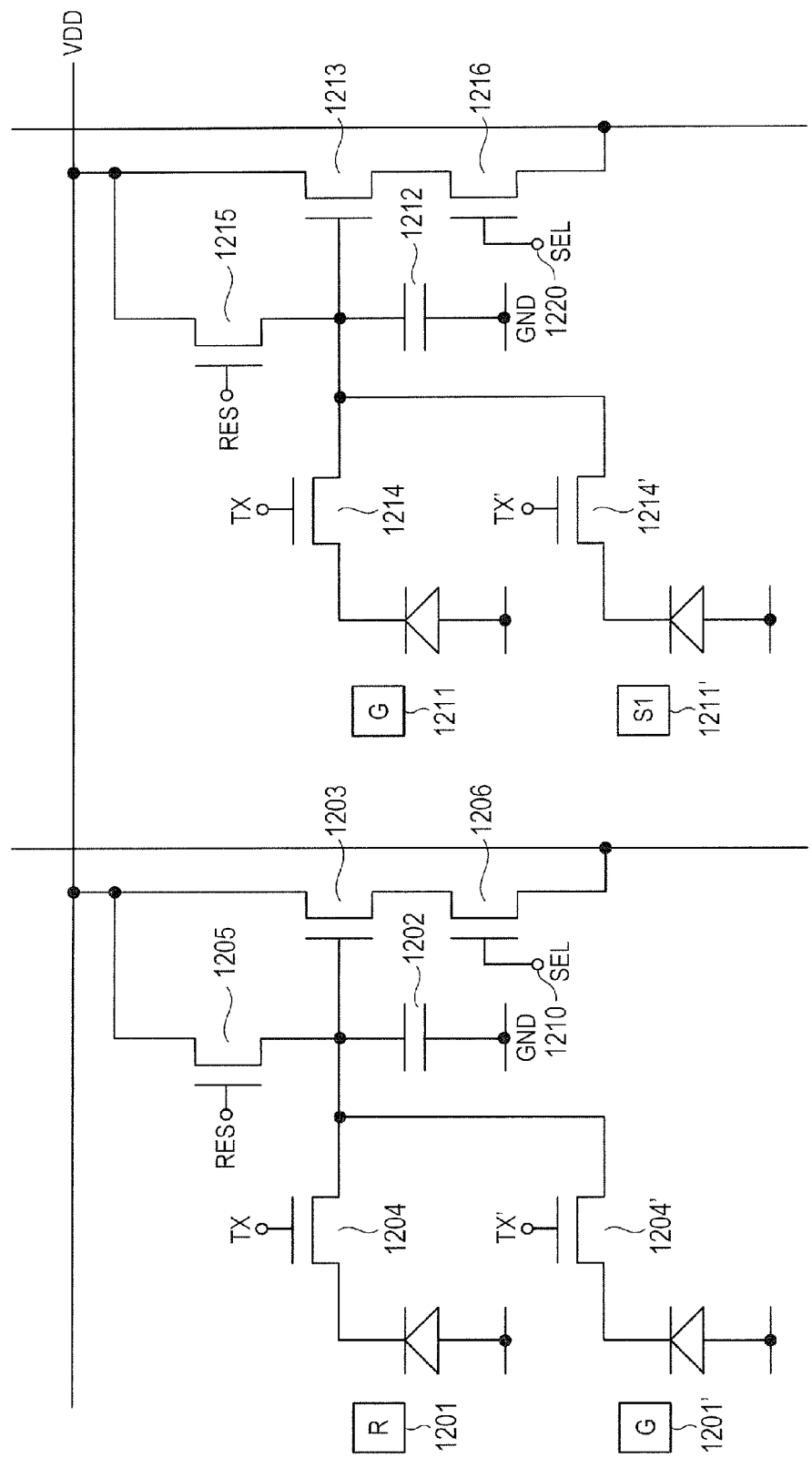
FIG. 14 is a circuit diagram of the pixel portion of the image pickup element.

FIG. 14 is a circuit diagram of the pixel portion 701 of the image pickup element 101. Two pixels that are extracted from a plurality of pixels located in the n-th row Vn, and two pixels that are extracted from a plurality of pixels located in the (n+1)th row Vn+1 are shown in FIG. 14. A photoelectric converter 1201 and a photoelectric converter 1211 are located in the n-th row Vn. A photoelectric converter 1201' and a photoelectric converter 1211' are located in the (n+1)th row Vn+1. A pixel that includes the photoelectric converter 1201 and a pixel that includes the photoelectric converter 1201' are adjacent to each other in the vertical direction. A pixel that includes the photoelectric converter 1211 and a pixel that includes the photoelectric converter 1211' are adjacent to each other in the vertical direction. The n-th row Vn is read in the first scanning, and the (n+1)th row Vn+1 is read in the second scanning. The timing of reset can be set for each row independently of other rows as described above. The description given here takes, as an example, a case in which an accumulation time set in pixels that are located in the (n+1)th row Vn+1 is longer than the accumulation time in pixels that are located in the n-th row Vn.

Seepage from one of two adjacent pixels to the other pixel can occur in an amount that depends on the signal amounts of the two pixels. Causes of the seepage between adjacent pixels include, for example, the diffusion of electric charges generated in the photoelectric converter of one pixel to the photoelectric converter of a pixel adjacent to the former pixel via the substrate. Another cause is reflection in which light supposed to enter one pixel is reflected by a metal wiring layer, cover glass, or other similar components provided on the substrate and enters a pixel adjacent to the former pixel. The seepage can occur also when the FD area 602 is shared by one pixel and a pixel adjacent to the former pixel. When the FD area 602 is shared by one pixel and a pixel adjacent to the former pixel, despite the fact that electric charges from the former pixel alone are desired to be transferred to the FD area 602 for the purpose of signal detection, electric charges from the pixel adjacent to the former pixel may seep into the FD area 602. The seepage between adjacent pixels impairs image signals and focus detection signals, which adversely affects image quality and focus detection precision.

The accumulation time in pixels located in rows that are read in the first scanning and the accumulation time in pixels located in rows that are read in the second scanning can be set separately from each other as described above. This can lead to a situation in which pixels in one of two rows that share the FD area 602 are saturated whereas pixels in the other row of the two rows are not saturated. For example, when the accumulation time is controlled so that a single image has exposure that is appropriate on the whole, some pixels may be saturated while a pixel adjacent to a saturated pixel is not saturated.

A drop in the image quality of a moving image that can occur when pixels located in rows from which signals for focus detection are read are saturated whereas pixels located in rows from which signals for generating a moving image are read are not saturated is described below with reference to FIG. 14. Pixels R and G for generating a moving image are arranged in the n-th row Vn. Here, the photoelectric converters 1201 and 1211 of the pixels R and G located in the n-th row Vn are not saturated. The pixel for focus detection S1 is arranged in the (n+1)th row Vn+1. In addition to the pixel for focus detection S1, the normal pixel G is arranged in the (n+1)th row Vn+1. Here, the photoelectric converters 1201' and 1211' of the pixels G and S1 located in the (n+1)th row Vn+1 are saturated. A transfer switch 1204 is provided between the photoelectric converter 1201 and an FD area 1202, and a transfer switch 1204' is provided between the photoelectric converter 1201' and the FD area 1202. A transfer switch 1214 is provided between the photoelectric converter 1211 and an FD area 1212, and a transfer switch 1214' is provided between the photoelectric converter 1211' and the FD area 1212. The transfer switches 1204, 1204', 1214, and 1214' are configured to control a potential barrier in a path between the photoelectric converter 1201 and the FD area 1202, a potential barrier in a path between the photoelectric converter 1201' and the FD area 1202, a potential barrier in a path between the photoelectric converter 1211 and the FD area 1212, and a potential barrier in a path between the photoelectric converter 1211' and the FD area 1212, respectively. When the transfer switches 1204 and 1204' are switched off, potential barriers are formed to prevent signal charges generated in the photoelectric converters 1201 and 1201' from flowing into the FD area 1202. When the transfer switches 1214 and 1214' are switched off, potential barriers are formed to prevent signal charges generated in the photoelectric converters 1211 and 1211' from flowing into the FD area 1212. However, the signal charges may flow over the potential barriers into the FD areas 1202 and 1212 when the photoelectric converters 1201, 1201', 1211, and 1211' are saturated. In the case where the photoelectric converter 1201' of the pixel G located in the (n+1)th row Vn+1 is saturated at the timing of reading a signal from the photoelectric converter 1201 of the pixel R located in the n-th row Vn, there may occur a phenomenon in which signal charges from the photoelectric converter 1201 and charges seeped from the photoelectric converter 1201' are added in the FD area 1202 and a signal that is generated based on the combined electric charges is read as a signal from the pixel R located in the n-th row Vn. In the case where the photoelectric converter 1211' of the pixel S1 located in the (n+1)th row Vn+1 is saturated at the timing of reading a signal from the photoelectric converter 1211 of the pixel G located in the n-th row Vn, there may occur a phenomenon in which signal charges from the photoelectric converter 1211 and charges seeped from the photoelectric converter 1211' are added in the FD area 1212 and a signal that is generated based on the combined electric charges is read as a signal from the pixel G located in the n-th row Vn. In such events, the pixel values of the pixels R and G that are located in the n-th row Vn increase by an amount corresponding to the seeped electric charges, thereby impairing the image quality of the moving image.

Meanwhile, a drop in focus detection precision that can occur when pixels located in rows from which signals for focus detection are read are not saturated whereas pixels located in rows from which signals for generating a moving image are read are saturated is described with reference to FIG. 14. Pixels R and G for generating a moving image are arranged in the n-th row Vn as described above. Here, the photoelectric converters 1201 and 1211 of the pixels R and G located in the n-th row Vn are saturated. The pixel for focus detection S1 is arranged in the (n+1)th row Vn+1 as described above. In addition to the pixel for focus detection S1, the normal pixel G is arranged in the (n+1)th row Vn+1. Here, the photoelectric converters 1201' and 1211' of the pixels G and S1 located in the (n+1)th row Vn+1 are not saturated. A phenomenon reverse to the ones described above occurs in this case. Specifically, when the photoelectric converter 1211 of the pixel G located in the n-th row Vn is saturated at the timing of reading a signal from the photoelectric converter 1211' of the pixel S1 located in the (n+1)th row Vn+1, a phenomenon occurs in which signal charges from the photoelectric converter 1211' and charges seeped from the photoelectric converter 1211 are added in the FD area 1212 and a signal that is generated based on the combined electric charges is read as a signal from the pixel for focus detection S1. This phenomenon occurs only in the (n+1)th row Vn+1, which is next to the n-th row Vn where pixels are saturated, and does not occur in the (n+2)th row Vn+2 because pixels located in the (n+2)th row Vn+2 do not share the FD area 1212 with pixels located in the (n+1)th row Vn+1. The phenomenon therefore may occur in the pixel for focus detection S1 (image-A pixel S1) located in the (n+1)th row Vn+1 but not in the pixel for focus detection S2 (image-B pixel S2) located in the (n+2)th row Vn+2. Further, light that reaches the pixel for focus detection S1 located in the (n+1)th row Vn+1 is light that has passed through the first pupil area 510 of the exit pupil 509 (see FIG. 6A to FIG. 6C) of the photographing lens 202. Light that reaches the normal pixel G located in the n-th row Vn, on the other hand, is light that has passed through the entire area of the exit pupil 509 of the photographing lens 202. In other words, light that reaches the pixel for focus detection S1 corresponds to the phase of the image A whereas light that reaches the normal pixel G does not reflect a phase deviation that corresponds to the out-of-focus amount. Signal charges of a different phase component consequently seep into the pixel for focus detection S1 from the normal pixel G. Phase difference focus detection detects, as described above, the out-of-focus amount of an object image by detecting the relative positions of the image-A signal and the image-B signal. The addition of a signal of a different phase component therefore makes it difficult to correctly detect a phase difference between the image A and the image B, which results in a drop in autofocus precision.

This embodiment uses the following methods to prevent the drop in the image quality of a moving image and the drop in focus detection precision that are caused by the phenomena described above.

Figure 15A:
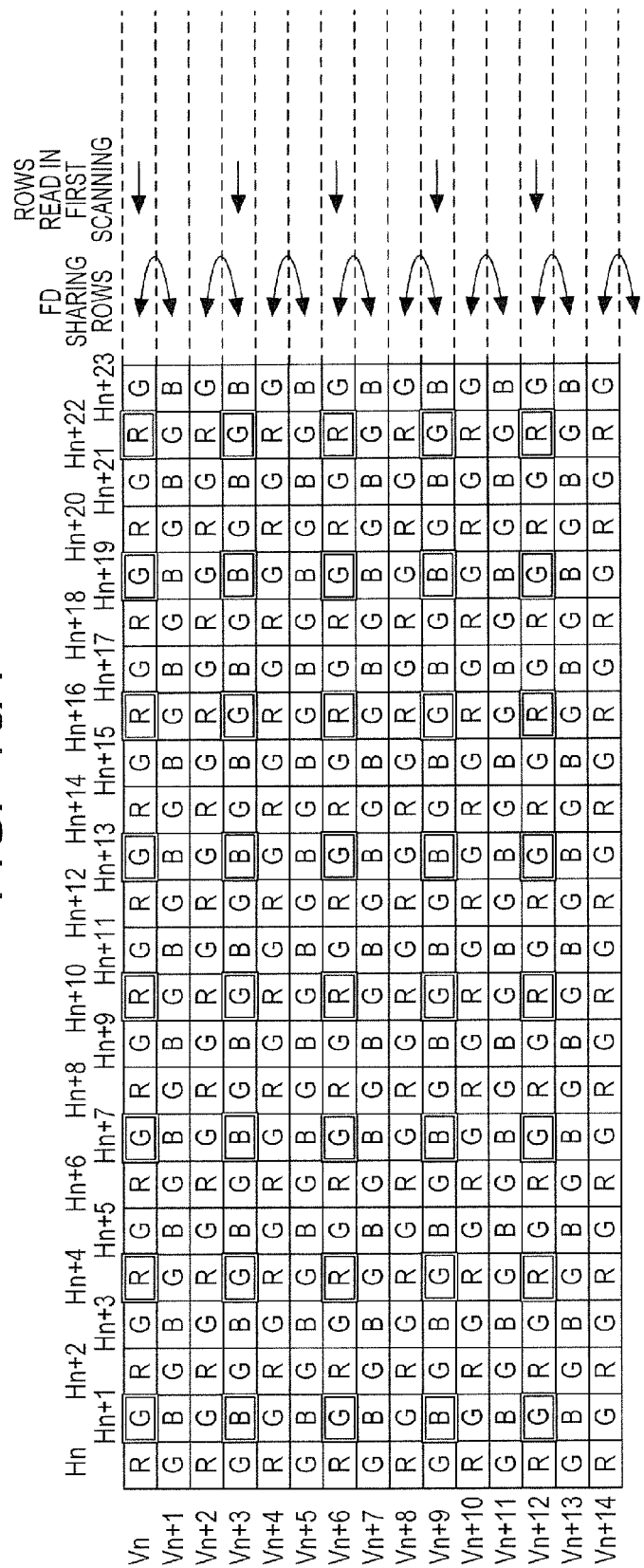
FIG. 15A and FIG. 15B are diagrams for illustrating examples of the layout of pixels in the image pickup element.
Figure 15B:
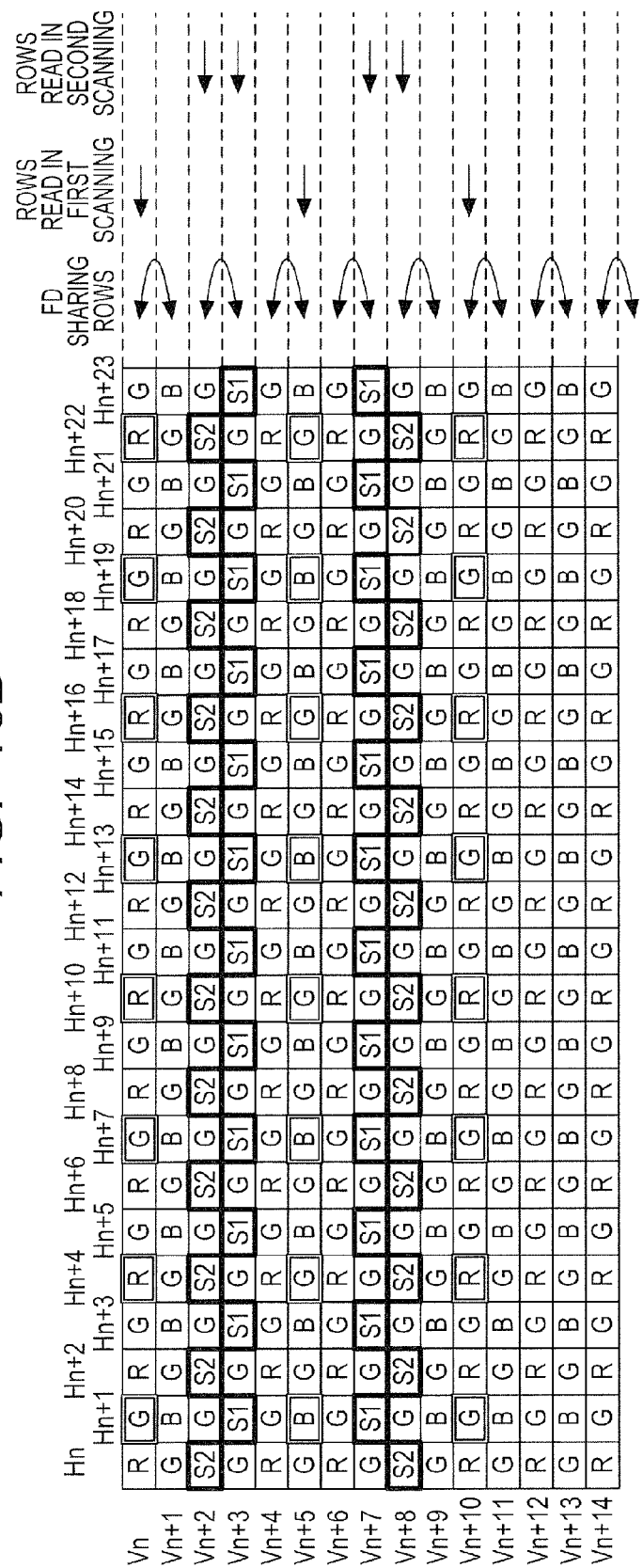

An example of the methods for preventing the described phenomena is to arrange the pixels for focus detection S1 and S2 in rows where pixels do not share the FD area 602 with pixels located in rows that are read in the first scanning, and to read signals from the pixels for focus detection S1 and S2 arranged in this manner in the second scanning. FIG. 15A and FIG. 15B are diagrams for illustrating examples of the layout of pixels in the image pickup element 101. In the example of FIG. 15A, pixels that are read in the first scanning are laid out relatively densely in the vertical direction. In the example of FIG. 15B, pixels that are read in the first scanning are laid out relatively sparsely in the vertical direction.

Illustrated in FIG. 15B is a case where the first scanning involves thinning reading in which a signal is read for every five pixels in the vertical direction and a signal is read for every three pixels in the horizontal direction. A pixel surrounded by the double line is a pixel that is read in the first scanning. The n-th row Vn and the (n+1)th row Vn+1 share one FD area 602. The (n+2)th row Vn+2 and the (n+3)th row Vn+3 share another FD area 602. An (n+4)th row Vn+4 and the (n+5)th row Vn+5 share still another FD area 602. The (n+6)th row Vn+6 and an (n+7)th row Vn+7 share yet still another FD area 602. An (n+8)th row Vn+8 and the (n+9)th row Vn+9 share yet still another FD area 602. The FD areas 602 in the (n+10)th row Vn+10 and an (n+11)th row Vn+11, and subsequent rows are shared in the same manner. The (n+2)th row Vn+2 and the (n+3)th row Vn+3, for example, are not rows that are read in the first scanning and are not rows that share the FD area 602 with a row that is read in the first scanning. The (n+7)th row Vn+7 and the (n+8)th row Vn+8, for example, are not rows that are read in the first scanning and are not rows that share the FD area 602 with a row that is read in the first scanning. The phenomena described above can thus be prevented by arranging the pixels for focus detection S1 and S2 in the manner illustrated in FIG. 15B when pixels that are read in order to generate a moving image are laid out relatively sparsely in the vertical direction. A drop in the image quality of a moving image and a drop in focus detection precision are prevented as a result.

When pixels that are read for generating a moving image are laid out relatively densely in the vertical direction as illustrated in FIG. 15A, on the other hand, the pixels for phase difference detection S1 and S2 cannot be arranged in a manner that fulfills the condition described above. However, preventing the phenomena is possible without employing the described method. Specifically, the phenomena as described above can be prevented by avoiding a time overlap between the accumulation period in pixels located in a row that is read in the first scanning and the accumulation period in pixels located in a row that is read in the second scanning.

Figure 16:
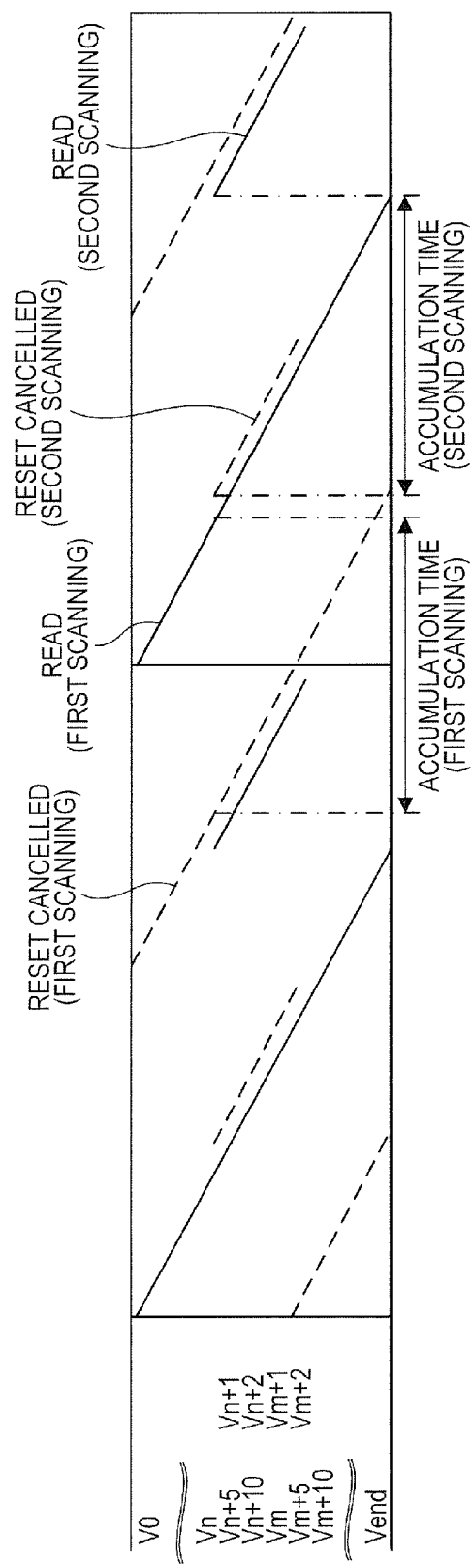
FIG. 16 is a diagram for illustrating an example of operation that is executed when a moving image is obtained.

FIG. 16 is a diagram for illustrating an example of operation that is executed when a moving image is obtained. Illustrated in FIG. 16 is a case in which signals are read while avoiding an overlap between the accumulation period in pixels that are read in the first scanning and the accumulation period in pixels that are read in the second scanning. The broken line in FIG. 16 indicates timing at which reset is cancelled. The solid line in FIG. 16 indicates the timing of reading. Rows V0, Vn, Vn+5, Vn+10, Vm, Vm+5, Vm+10, and Vend in FIG. 16 are an example of rows that are read in the first scanning. Rows Vn+1, Vn+2, Vm+1, and Vm+2 in FIG. 16 are an example of rows that are read in the second scanning. "Tread1" indicates the timing of reading in the first scanning, and "Tread2" indicates the timing of reading in the second scanning. To read signals while avoiding an overlap between the accumulation period in pixels that are read in the first scanning and the accumulation period in pixels that are read in the second scanning, Expressions (1) and (2) need to be satisfied.

$$T1 = Tvd - T2 \quad (1)$$

$$T2 = Tread2 - Tread1 \quad (2)$$

In Expressions (1) and (2), T1 represents the longest accumulation period that can be set to pixels in a row that is read in the first scanning. Tvd represents the cycle of update of reading operation. T2 represents the longest accumulation period that can be set to pixels in a row that is read in the second scanning. Tread1' represents reading timing in the first scanning for a row where pixels share the FD area 602 with pixels located in a row that is read in the second scanning. Tread2 in Expression (2) represents the timing of reading signals from pixels that share the FD area 602 with pixels located in a row that is read at Tread1'. Which row is to be read in the second scanning is set based on the position of the AF frame.

In this manner, signals may be read while avoiding an overlap between the accumulation period in pixels located in a row that is read in the first scanning and the accumulation period in pixels located in a row that is read in the second scanning. The seepage of a signal between pixels that share the FD area 602 can be prevented with this method as well.

An accumulation time suitable to obtain a moving image and an accumulation time suitable for focus detection may be set separately. However, there are limits to the length of accumulation time or accumulation period that can be set, as is understood from Expressions (1) and (2). The reading operation described above may therefore be applied only in autofocus operation, and withheld when autofocus operation is not executed. The CPU 105, the timing generator 104, and other components can together function as a controller configured to limit the accumulation time or accumulation period.

Figure 17:
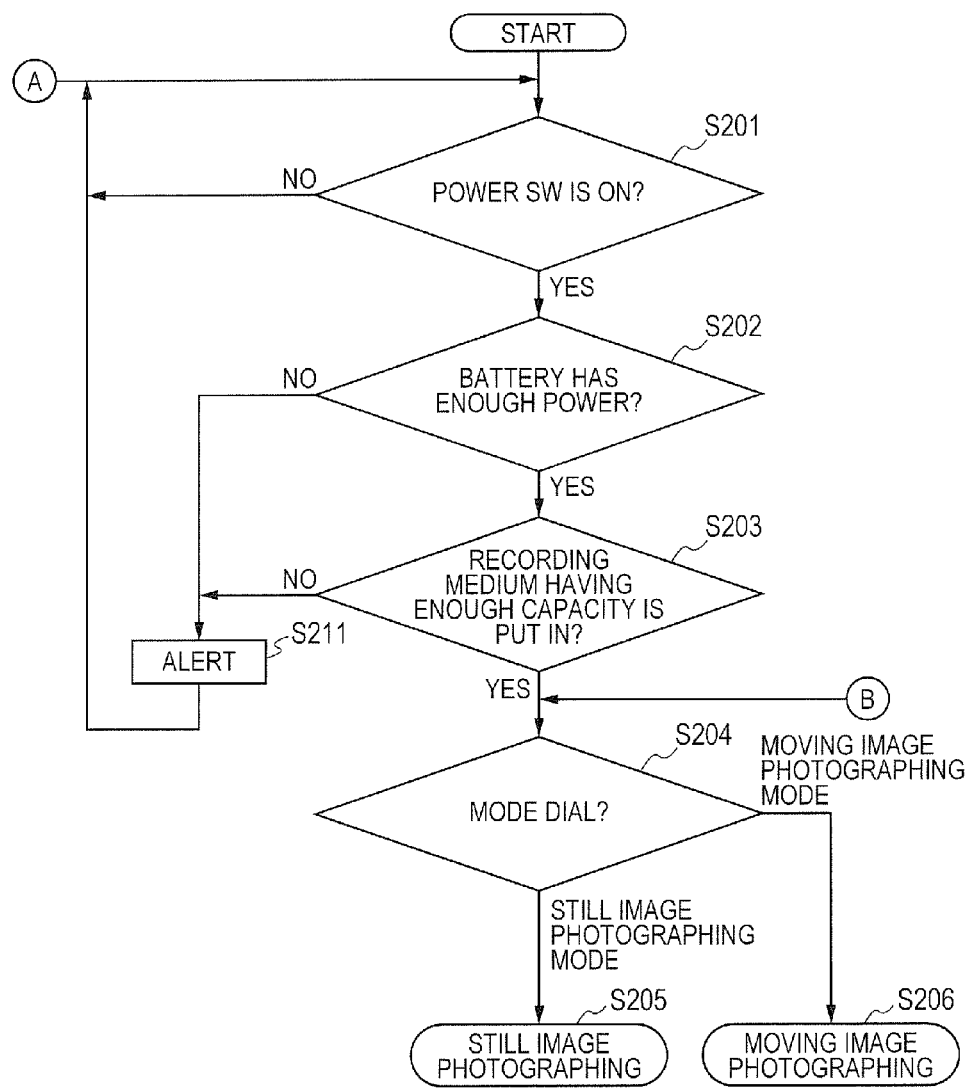
FIG. 17 is a flow chart for illustrating the operation of the image pickup apparatus according to the embodiment of the present invention.

The operation of the image pickup apparatus according to this embodiment is described next with reference to FIG. 17. FIG. 17 is a flow chart for illustrating the operation of the image pickup apparatus according to this embodiment.

The CPU 105 proceeds from Step S201 to Step S202 when the power switch 109 is set to "on" ("YES" in Step S201). In the case where the power switch 109 is off ("NO" in Step S201), Step S201 is repeated.

In Step S202, the CPU 105 determines whether or not a battery (not shown) has enough electrical energy left to photograph (Step S202). In the case where the electrical energy left in the battery is not enough to photograph ("NO" in Step S202), the CPU 105 displays an alert message to that effect on the display 114 (Step S211). The CPU 105 then returns to Step S201 to wait for the power switch 109 to be switched on again. In the case where the electrical energy left in the battery is enough to photograph ("YES" in Step S202), the CPU 105 proceeds to Step S203.

In Step S203, the CPU 105 checks the recording medium 108 (Step S203). Specifically, the CPU 105 determines whether or not the recording medium 108 that is capable of recording data of a predetermined capacity or more is put in the image pickup apparatus 100. In the case where the recording medium 108 that is capable of recording data of a predetermined capacity or more is not put in the image pickup apparatus 100 ("NO" in Step S203), the CPU 105 displays an alert message to that effect on the display 114 (Step S211), and returns to Step S201. In the case where the recording medium 108 that is capable of recording data of a predetermined capacity or more is put in the image pickup apparatus 100 ("YES" in Step S203), the CPU 105 proceeds to Step S204.

In Step S204, the CPU 105 determines which of the still image photographing mode and the moving image photographing mode has been set with the use of the mode dial 112 (Step S204). In the case where the mode dial 112 is set to the still image photographing mode, the CPU 105 executes processing of photographing a still image (Step S205). In the case where the mode dial 112 is set to the moving image photographing mode, on the other hand, the CPU 105 executes processing of photographing a moving image (Step S206).

Figure 18:
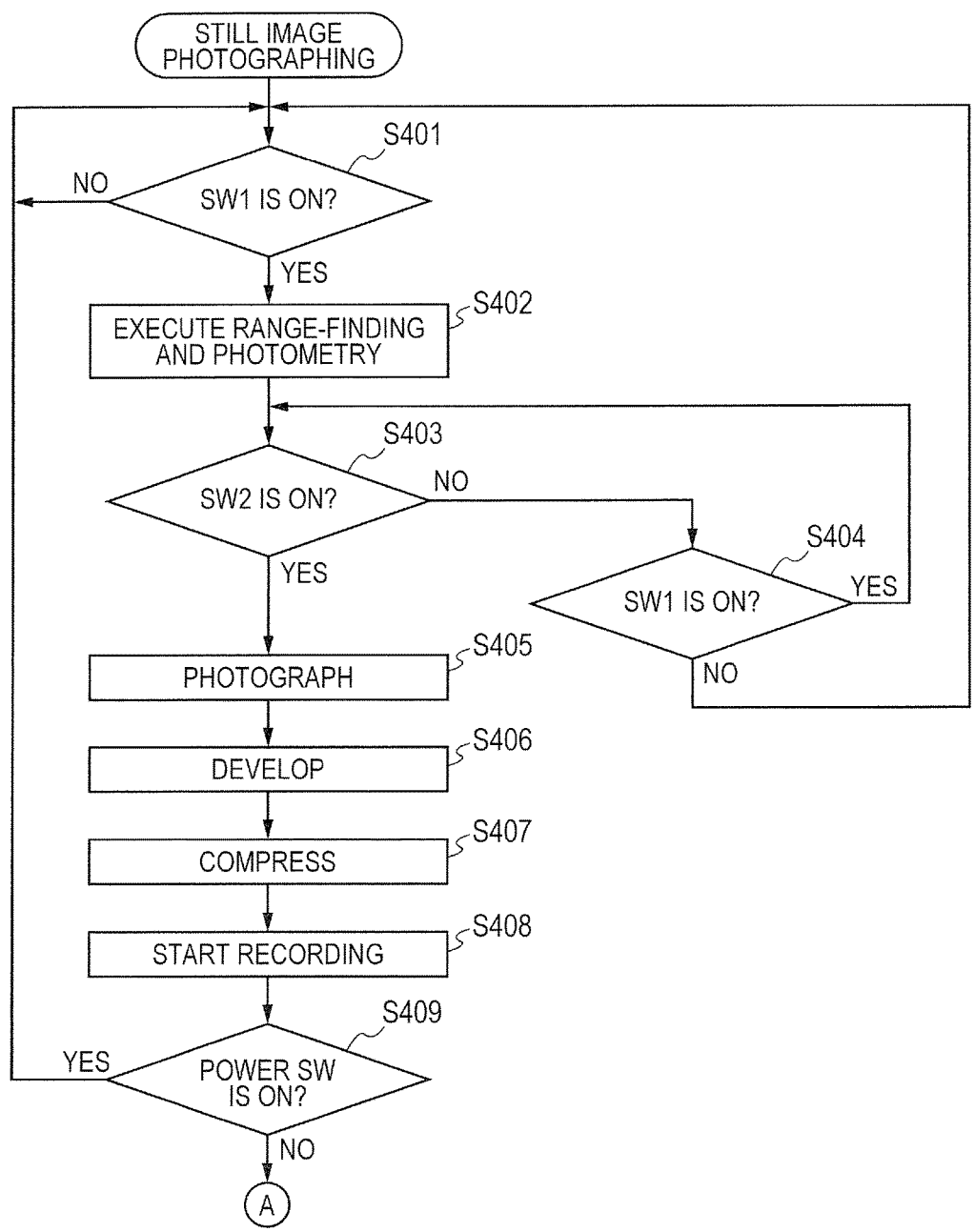
FIG. 18 is a flow chart for illustrating operation that is executed when a still image is obtained.

Still image photographing executed in Step S205 of FIG. 17 is described next with reference to FIG. 18. FIG. 18 is a flow chart for illustrating operation that is executed when a still image is obtained.

The CPU 105 first waits for the first-stage shutter switch SW1 to be switched on (Step S401). When the first-stage shutter switch SW1 is switched on ("YES" in Step S401), the CPU 105 executes photometric processing based on photometric information from a photometry controller (not shown) (Step S402). Specifically, the CPU 105 determines the aperture value of the diaphragm 204 of the photographing lens 202 and the shutter speed. The CPU 105 also executes range-finding processing when the first-stage shutter switch SW1 is switched on ("YES" in Step S401), based on focus detection information from the focus detection element 209 (Step S402). Specifically, the CPU 105 executes focus detection calculation processing for aligning the lens group for focus adjustment 205 of the photographing lens 202 with the position of the object.

The CPU 105 next determines whether or not the second-stage shutter switch SW2 is switched on (Step S403). In the case where the second-stage shutter switch SW2 is not switched on ("NO" in Step S403), the CPU 105 determines whether or not the first-stage shutter switch SW1 remains switched on (Step S404). In the case where the first-stage shutter switch SW1 is still switched on, the CPU 105 returns to Step S403 to determine whether or not the second-stage shutter switch SW2 is switched on. In the case where the first-stage shutter switch SW1 is no longer switched on ("NO" in Step S404), on the other hand, the CPU 105 returns to Step S401 to wait for the first-stage shutter switch SW1 to be switched on again. When it is determined in Step S403 that the second-stage shutter switch SW2 is switched on ("YES" in Step S403), the CPU 105 executes processing of photographing a still image (Step S405). In the still image photographing processing, signals are read in the all-pixel reading mode where signals from normal pixels and signals from the pixels for phase difference detection S1 and S2 are read without thinning. Still image data is obtained in this manner.

The CPU 105 next causes the DSP 103 to execute processing of developing the obtained image data (Step S406). The CPU 105 next causes the DSP 103 to execute compression processing on the image data processed by the development processing, and causes the DSP 103 to store the image data processed by the compression processing in a free area of the RAM 107 (Step S407).

The CPU 105 next causes the DSP 103 to read the image data stored in the RAM 107, and causes the DSP 103 to execute processing of recording the read image data on the recording medium 108 (Step S408). The CPU 105 then checks whether or not the power switch 109 is switched on (Step S409).

In the case where the power switch 109 is still switched on ("YES" in Step S409), the CPU 105 returns to Step S401 to prepare for the next photographing of a still image. In the case where the power switch 109 is switched off ("NO" in Step S409), on the other hand, the CPU 105 returns to Step S201 of FIG. 17 to wait for the power switch 109 to be switched on again.

Moving image photographing executed in Step S206 of FIG. 17 is described next. When the mode dial 112 is set to the moving image photographing mode, the focal plane shutter 210 is opened and monitoring operation in which pieces of image data read out of the image pickup element 101 are kept developed and displayed on the display 114 is executed. Moving image data is kept recorded on the recording medium 108 for the duration in which the second-stage shutter switch SW2 remains switched on. When the mode dial 112 is changed to other settings than the moving image photographing mode, the photographing mode switches to other modes than the moving image photographing mode. Photographing in the moving image photographing mode is ended when the power switch 109 is set to "off". The moving image photographing mode includes the "high definition mode" and "high speed mode" described above. In the "high definition mode", thinning reading of signals from normal pixels is executed so that a signal from a normal pixel is read for every three pixels in the vertical direction and the horizontal direction both. In the "high speed mode", on the other hand, thinning reading of signals from normal pixels is executed so that a signal from a normal pixel is read for every five pixels in the vertical direction and a signal from a normal pixel is read for every three pixels in the horizontal direction. A switch between the "high definition mode" reading and the "high speed mode" reading can be made by changing the settings of the image pickup element 101 and the settings of the timing generator 104 as instructed by the CPU 105.

In the "high definition mode" and the "high speed mode" both, the first scanning in which signals from normal pixels are read is followed, after completion, by the second scanning in which signals from the pixels for phase difference detection S1 and S2 are read. In the second scanning where signals from the pixels for phase difference detection S1 and S2 are read, skip operation is executed. In the skip operation, the pixels for phase difference detection S1 and S2 that are located outside the AF frame where focusing takes place are identified, an area where the identified pixels for phase difference detection S1 and S2 are located is set as a skip area, and signals from the pixels for phase difference detection S1 and S2 located in the skip area are not read. The skip operation is executed based on the skip setting signal, which is input from the timing generator 104 to the horizontal scanning portion 708.

The number of pixels read when a moving image is obtained in the "high definition mode" is approximately ⅑ of the number of pixels read when a still image is obtained. The number of pixels read when a moving image is obtained in the "high speed mode" is approximately ⅟₁₅ of the number of pixels read when a still image is obtained. In the "high definition mode" and the "high speed mode" both, a moving image can thus be obtained in a greatly shorter time than when a still image is obtained.

Figure 19:
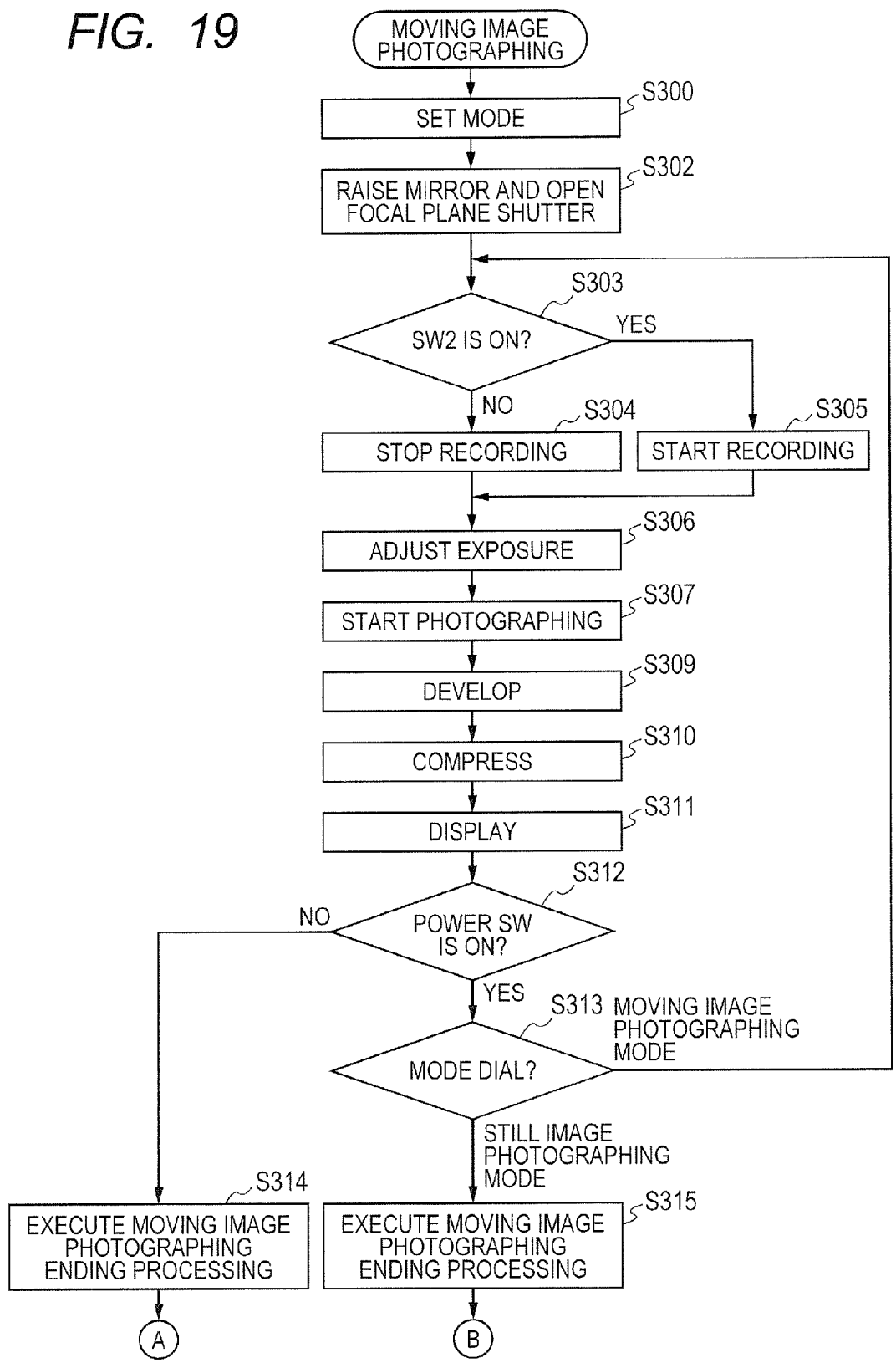
FIG. 19 is a flow chart for illustrating operation that is executed when a moving image is obtained.

FIG. 19 is a flow chart for illustrating operation that is executed when a moving image is obtained.

The CPU 105 first sets a mode based on the settings of the mode dial 112 (Step S300). The moving image photographing mode includes the "high definition mode" and the "high speed mode" as described above. The CPU 105 sets whether a moving image is to be obtained in the "high definition mode" or the "high speed mode" based on the settings of the mode dial 112. The CPU 105 next executes the operation of raising the main mirror 207 and the sub-mirror 208 up, and the operation of opening the focal plane shutter 210 (Step S302). This makes an object image constantly incident on the image pickup element 101 as illustrated in FIG. 2B.

The CPU 105 next determines whether or not the second-stage shutter switch SW2 is switched on (Step S303). In the case where the second-stage shutter switch SW2 is switched on ("YES" in Step S303), the CPU 105 starts recording operation that is the operation of writing moving image data to the recording medium 108 (Step S305). The CPU 105 then proceeds to Step S306. In the case where the recording operation for writing moving image data to the recording medium 108 is being executed despite the second-stage shutter switch SW2 being switched off ("NO" in Step S303), the CPU 105 stops the recording operation (Step S304). In other words, the CPU 105 continues the moving image data recording processing for the duration in which the second-stage shutter switch SW2 remains switched on, and stops the moving image data recording processing at the time when the second-stage shutter switch SW2 is switched off. The CPU 105 then proceeds to Step S306. The recording operation may be stopped before the second-stage shutter switch SW2 is switched off, in the case where a predetermined length of time has elapsed or in the case where the remaining capacity of the recording medium 108 has become small.

In Step S306, the CPU 105 adjusts exposure in order to execute monitoring operation in which the monitor display of image data on the display 114 is repeated. In the exposure adjustment, the CPU 105 determines the exposure amount based on image data obtained in the immediately preceding moving image photographing or data obtained from the pixels for phase difference detection S1 and S2 in the immediately preceding moving image photographing, and sets the lens diaphragm 204 and the gain in the AFE 102 to values that yield an appropriate exposure amount. In the case where a moving image is photographed for the first time, data of immediately preceding moving image photographing does not exist, and initial values are set to the lens diaphragm 204 and the gain in the AFE 102. This embodiment has, as described above, an option of avoiding an overlap between the accumulation period in the first scanning where normal pixels are read in order to obtain a moving image and the accumulation period in the second scanning where pixels for focus detection are read. In this case, the accumulation time or accumulation period is set so that the accumulation period in the first scanning and the accumulation period in the second scanning do not overlap with each other.

The CPU 105 next executes moving image photographing processing (Step S307). In order to obtain a moving image, the image pickup element 101 executes the clearing of electric charges, the accumulation of electric charges, and reading repeatedly based on drive signals from the timing generator 104. In the "high definition mode", normal pixels of the image pickup element 101 are read by thinning reading in which a signal is read for every three pixels in the vertical direction and a signal is read for every three pixels in the horizontal direction. In the "high speed mode", normal pixels of the image pickup element 101 are read by thinning reading in which a signal is read for every five pixels in the vertical direction and a signal is read for every three pixels in the horizontal direction. After the first scanning in which normal pixels are read is completed, the second scanning is executed to read the pixels for phase difference detection S1 and S2. The second scanning reads signals only from the pixels for phase difference detection S1 and S2 that are located within an area that corresponds to the AF frame where focusing takes place. Signals are not read from the pixels for phase difference detection S1 and S2 that are located outside the area that corresponds to the AF frame where focusing takes place. Signals from the pixels for phase difference detection S1 and S2 that are located within the area that corresponds to the AF frame where focusing takes place are read without thinning. The reading of normal pixels and the reading of pixels for phase difference detection S1 and S2 are repeated at a predetermined frame rate. The signals read out of the pixels for phase difference detection S1 and S2 in the second scanning are input to the correction unit for focus detection 1009, which is provided in the DSP 103. The correction unit for focus detection 1009 performs pixel-by-pixel correction and correction based on optical conditions at the time of moving image photographing on the signals read out of the pixels for phase difference detection S1 and S2. The signals corrected by the correction unit for focus detection 1009 are transferred to the focus detection calculation portion 1006. The focus detection calculation portion 1006 calculates defocus information based on outputs from the two types of pixels for phase difference detection S1 and S2 in which the slits 508a and 508b of different phases are formed. The defocus information calculated by the focus detection calculation portion 1006 is transferred to the CPU 105. The CPU 105 executes AF control by adjusting the position of the lens group for focus adjustment 205, which is arranged inside the photographing lens 202, based on the defocus information.

In Step S309, the development unit 1001 in the DSP 103 performs development processing on the signals read out of normal pixels in the first scanning. In the development processing, data is developed after correction processing for correcting a signal from a defective pixel is executed. In Step S310, the compression unit 1002 in the DSP 103 performs compression processing on the developed data. An image obtained through the compression is displayed on the display 114 under display control of the display controller 1005 in the DSP 103 (Step S311). This operation is repeated at a predetermined frame rate, thereby executing operation for obtaining a moving image.

The CPU 105 next executes the processing of ending moving image photographing (Step S314) when the power switch 109 is switched off ("NO" in Step S312), and then returns to Step S201 of FIG. 17. In the case where the power switch 109 remains switched on ("YES" in Step S312), the CPU 105 checks the mode dial 112 (Step S313).

In the case where the mode dial 112 is still set to the moving image photographing mode, the CPU 105 returns to Step S303. In the case where the mode dial 112 has been switched to the still image photographing mode, the CPU 105 executes the moving image photographing ending processing (Step S315), and returns to Step S204 of FIG. 17.

The moving image photographing ending processing in Steps S314 and S315 involves stopping the recording operation in the case where the recording operation is being executed. The moving image photographing ending processing also involves stopping the driving of the image pickup element 101, and stopping the reading processing executed by the DSP 103. The moving image photographing ending processing also involves closing the focal plane shutter 210 and pulling the main mirror 207 and the sub-mirror 208 down. Moving image photographing is finished in this manner.

According to one mode of this embodiment, when the pixels for phase difference detection S1 and S2 that share the FD areas 602 with normal pixels read that are in the first scanning are read in the second scanning, the image pickup apparatus 100 executes control to limit the accumulation period (accumulation time) in the normal pixels, or to limit the accumulation period (accumulation time) in the pixels for phase difference detection S1 and S2. Specifically, the accumulation period in the normal pixels and the accumulation period in the pixels for phase difference detection S1 and S2 are set separately so that an overlap between the former and the latter is avoided. The accumulation time in the normal pixels and the accumulation time in the pixels for phase difference detection S1 and S2 may be set separately based on the timing of reading signals out of the normal pixels and the timing of reading signals out of the pixels for phase difference detection S1 and S2. According to the one mode of this embodiment, seepage of signal charges between normal pixels that are read in the first scanning and the pixels for phase difference detection S1 and S2 that are read in the second scanning is prevented even when the normal pixels and the pixels for phase difference detection S1 and S2 share the FD areas 602. An image pickup apparatus capable of preventing a drop in image quality and focus detection precision can therefore be provided according to the one mode of this embodiment.

According to the other mode of this embodiment, the pixels for phase difference detection S1 and S2 that do not share the FD areas 602 with normal pixels located in rows that are read in the first scanning are identified, and rows where the identified pixels for phase difference detection S1 and S2 are located are selected in the second scanning. This means that, according to the other mode of this embodiment, no electric charges seep into the pixels for phase difference detection S1 and S2 that are read in the second scanning even when normal pixels that are read in the first scanning are saturated. No electric charges seep into normal pixels that are read in the first scanning either, even when the pixels for phase difference detection S1 and S2 that are read in the second scanning are saturated. An image pickup apparatus that is provided according to the other mode of this embodiment is therefore capable of preventing a drop in image quality and focus detection precision as well.

Modified Embodiment

The exemplary embodiment of the present invention is described above, but the present invention is not limited to this embodiment and can be modified and changed variously within the scope of the gist thereof.

For example, the present invention is not limited to the example used in the description of the embodiment in which the second scanning for reading signals out of the pixels for phase difference detection S1 and S2 is executed after the first scanning for performing thinning reading on normal pixels. For example, the first scanning for performing thinning reading on normal pixels may instead be executed after the second scanning for reading signals out of the pixels for phase difference detection S1 and S2. The advantage of this case is that, because defocus information is obtained before an image is obtained, the lens can be driven at an earlier point. It is easy to set the image pickup apparatus 100 so that the second scanning is executed prior to the first scanning. The image pickup apparatus 100 may also be set so that the second scanning is executed after the first scanning in one frame while the first scanning is executed after the second scanning in another frame.

Figure 20:
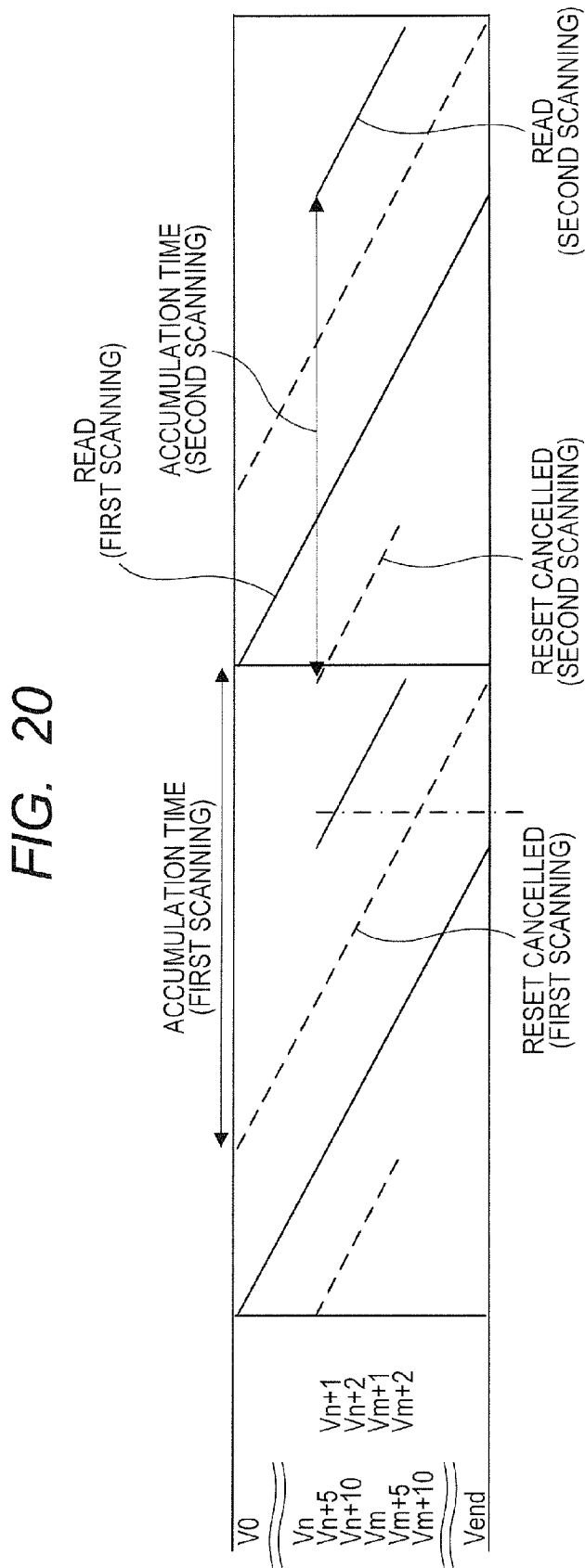
FIG. 20 is a diagram for illustrating an example of reading operation according to a modified embodiment of the present invention.

The present invention is not limited to the example used in the description of the embodiment in which the seepage of electric charges from one of a pixel that is read in the first scanning and a pixel that is read in the second scanning to the other is prevented completely. A slight amount of seepage of the electric charges between the pixels is not much of a problem as long as the amount remains small. The accumulation periods or accumulation times of the pixel that is read in the first scanning and the pixel that is read in the second scanning therefore only need to be set within a range that does not cause a conspicuous deterioration in image quality and focus detection precision. FIG. 20 is a time chart for illustrating an example of reading operation in an image pickup apparatus according to a modified embodiment of the present invention. The broken line indicates timing at which reset is cancelled, and the solid line indicates timing at which a signal is read out of a pixel. As illustrated in FIG. 20, the accumulation period in pixels located in a row that is read in the first scanning and the accumulation period in pixels located in a row that is read in the second scanning partially overlap with each other. In the mode illustrated in FIG. 20, the accumulation period (accumulation time) in pixels located in a row that is read in the first scanning is set not shorter than the accumulation period in pixels located in a row that is read in the second scanning. Electric charges can seep from one of a pixel that is read in the first scanning and a pixel that is read in the second scanning to the other because the accumulation period in pixels located in a row that is read in the first scanning and the accumulation period in pixels located in a row that is read in the second scanning partially overlap with each other. However, light fluxes that have passed through partial areas of the exit pupil of the image pickup optical system enter the pixels for focus detection S1 and S2, which are read in the second scanning, whereas a light flux from the entire area of the exit pupil enters normal pixels, which are read in the first scanning. This makes the pixels for focus detection S1 and S2 that are read in the second scanning less prone to saturate than normal pixels read in the first scanning. In addition, in the mode of FIG. 20, the accumulation period in pixels located in a row that is read in the first scanning is set not shorter than the accumulation period in pixels located in a row that is read in the second scanning. The chance is therefore very high that pixels located in a row that is read in the first scanning become saturated when pixels located in a row that is read in the second scanning are saturated and electric charges from there seep into the pixels located in a row that is read in the first scanning. Consequently, the seepage of the electric charges between pixels in this case does not cause a conspicuous drop in image quality and focus detection precision. The mode illustrated in FIG. 20 is therefore acceptable. In other words, the accumulation period in pixels located in a row that is read in the first scanning may be set not shorter than the accumulation period in pixels located in a row that is read in the second scanning.

The present invention is not limited to the example used in the description of the embodiment in which signals are read while avoiding an overlap between the accumulation period in pixels located in a row that is read in the first scanning and the accumulation period in pixels located in a row that is read in the second scanning. For example, signals may be read while avoiding an overlap equal to or longer than a predetermined length of time between the accumulation period in pixels located in a row that is read in the first scanning and the accumulation period in pixels located in a row that is read in the second scanning. When the time overlap is relatively short, the seepage of signals between pixels that share the FD area 602 can be kept small enough.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-009789, filed Jan. 21, 2016, which is hereby incorporated by reference herein in its entirety.

What is claimed is:

1. An image pickup apparatus, comprising:
    a pixel array portion in which a plurality of pixels each including a photoelectric converter are arranged into a matrix pattern, a first pixel among the plurality of pixels is configured to output a signal that is generated based on a light flux that passes through an entire area of an exit pupil of an image pickup optical system, a second pixel among the plurality of pixels is configured to output a signal that is generated based on a light flux that passes through a pupil area, which is a part of the exit pupil, and a floating diffusion area connected to the photoelectric converter via a transfer switch is shared by the plurality of pixels located in a plurality of rows adjacent to one another;
    a row selecting unit configured to select, in first scanning, a row in which the first pixel is arranged while thinning some pixels, and to select, in second scanning, a row in which the second pixel is arranged and which differs from the row selected in the first scanning;
    a reading unit configured to read a signal that is generated based on a voltage of the floating diffusion area of the pixel that is located in the row selected by the row selecting unit; and
    a controller configured to set a first accumulation period for the row in which the first pixel is arranged and a second accumulation period for the row in which the second pixel is arranged separately so as to prevent the first accumulation period and the second accumulation period from overlapping with each other for a predetermined length of time or longer, when the first pixel located in one row that is read in the first scanning shares the floating diffusion area with the second pixel that is located in another row and the another row is read in the second scanning.

2. The image pickup apparatus according to claim 1, wherein the controller is configured to set the first accumulation period and the second accumulation period separately based on timing at which a signal is read out of the first pixel located in the one row and timing at which a signal is read out of the second pixel located in the another row.

3. An image pickup apparatus, comprising:
    a pixel array portion in which a plurality of pixels each including a photoelectric converter are arranged into a matrix pattern, a first pixel among the plurality of pixels is configured to output a signal that is generated based on a light flux that passes through an entire area of an exit pupil of an image pickup optical system, a second pixel among the plurality of pixels is configured to output a signal that is generated based on a light flux that passes through a pupil area, which is a part of the exit pupil, and a floating diffusion area connected to the photoelectric converter via a transfer switch is shared by the plurality of pixels located in a plurality of rows adjacent to one another;

a row selecting unit configured to select, in first scanning, a row in which the first pixel is arranged while thinning some pixels, and to select, in second scanning, a row in which the second pixel is arranged and which differs from the row selected in the first scanning;

a reading unit configured to read a signal that is generated based on a voltage of the floating diffusion area of the pixel that is located in the row selected by the row selecting unit; and a controller configured to set a first accumulation period for the row in which the first pixel is arranged and a second accumulation period for the row in which the second pixel is arranged separately so that the first accumulation period is not shorter than the second accumulation period, when the first pixel located in one row that is read in the first scanning shares the floating diffusion area with the second pixel that is located in another row and the another row is read in the second scanning.

4. The image pickup apparatus according to claim 1, further comprising a mode setting unit capable of setting a first mode in which an image having a first pixel count is to be obtained and a second mode in which an image having a second pixel count different from the first pixel count is to be obtained, wherein the row selecting unit is configured to select, when the first mode is set, the row in which the first pixel is arranged while thinning some pixels in a first manner, and to select, when the second mode is set, the row in which the second pixel is arranged while thinning some pixels in a second manner, which differs from the first manner.

5. The image pickup apparatus according to claim 3, further comprising a mode setting unit capable of setting a first mode in which an image having a first pixel count is to be obtained and a second mode in which an image having a second pixel count different from the first pixel count is to be obtained, wherein the row selecting unit is configured to select, when the first mode is set, the row in which the first pixel is arranged while thinning some pixels in a first manner, and to select, when the second mode is set, the row in which the second pixel is arranged while thinning some pixels in a second manner, which differs from the first manner.

6. A reading method for reading signals from a pixel array portion in which a plurality of pixels each including a photoelectric converter are arranged into a matrix pattern, a first pixel among the plurality of pixels is configured to output a signal that is generated based on a light flux that passes through an entire area of an exit pupil of an image pickup optical system, a second pixel among the plurality of pixels is configured to output a signal that is generated based on a light flux that passes through a pupil area, which is a part of the exit pupil, and a floating diffusion area connected to the photoelectric converter via a transfer switch is shared by the plurality of pixels located in a plurality of rows adjacent to one another, the reading method comprising:

first scanning of scanning a row in which the first pixel is arranged while thinning some pixels, thereby reading a signal that is generated based on a voltage of the floating diffusion area of the first pixel; and second scanning of scanning a row in which the second pixel is arranged and which differs from the row selected in the first scanning, thereby reading a signal that is generated based on a voltage of the floating diffusion area of the second pixel, wherein, when the first pixel located in one row that is read in the first scanning shares the floating diffusion area with the second pixel that is located in another row and the another row is read in the second scanning, a first accumulation period for the row in which the first pixel is arranged and a second accumulation period for the row in which the second pixel is arranged are set separately so as to avoid an overlap of a predetermined length of time or longer between the first accumulation period and the second accumulation period.

7. A reading method for reading signals from a pixel array portion in which a plurality of pixels each including a photoelectric converter are arranged into a matrix pattern, a first pixel among the plurality of pixels is configured to output a signal that is generated based on a light flux that passes through an entire area of an exit pupil of an image pickup optical system, a second pixel among the plurality of pixels is configured to output a signal that is generated based on a light flux that passes through a pupil area, which is a part of the exit pupil, and a floating diffusion area connected to the photoelectric converter via a transfer switch is shared by the plurality of pixels located in a plurality of rows adjacent to one another, the reading method comprising:

first scanning of scanning a row in which the first pixel is arranged while thinning some pixels, thereby reading a signal that is generated based on a voltage of the floating diffusion area of the first pixel; and second scanning of scanning a row in which the second pixel is arranged and which differs from the row selected in the first scanning, thereby reading a signal that is generated based on a voltage of the floating diffusion area of the second pixel, wherein, when the first pixel located in one row that is read in the first scanning shares the floating diffusion area with the second pixel that is located in another row and the another row is read in the second scanning, a first accumulation period for the row in which the first pixel is arranged and a second accumulation period for the row in which the second pixel is arranged are set separately so that the first accumulation period is not shorter than the second accumulation period.

* * * * *